US012784009B2

(12) United States Patent
Goel

(10) Patent No.: US 12,784,009 B2
(45) Date of Patent: Nov. 3, 2026

(54) METHOD AND SYSTEM FOR PROXIMITY-BASED CONTACT TRANSFER

(71) Applicant: GG TECHNOLOGIES INC., Santa Monica, CA (US)

(72) Inventor: Gaurav Goel, Paris (FR)

(73) Assignee: GG Technologies Inc., Santa Monica, CA (US)

(*) Notice: Subject to any disclaimer, the term of this patent is extended or adjusted under 35 U.S.C. 154(b) by 0 days.

(21) Appl. No.: 18/667,214

(22) Filed: May 17, 2024

(65) Prior Publication Data

US 2024/0305965 A1 Sep. 12, 2024

Related U.S. Application Data

(63) Continuation of application No. 16/870,681, filed on May 8, 2020, now Pat. No. 12,022,369.

(60) Provisional application No. 62/845,753, filed on May 9, 2019.

(51) Int. Cl.

| | |
|---|---|
| ***G06Q 10/40*** | (2026.01) |
| ***G06Q 20/32*** | (2012.01) |
| ***G06Q 20/34*** | (2012.01) |
| ***H04L 51/04*** | (2022.01) |
| ***H04W 4/80*** | (2018.01) |
| ***H04W 8/00*** | (2009.01) |
| ***H04W 12/06*** | (2021.01) |

(52) U.S. Cl.

CPC ......... *G06Q 10/40* (2026.01); *G06Q 20/3278* (2013.01); *G06Q 20/352* (2013.01); *H04L 51/04* (2013.01); *H04W 4/80* (2018.02); *H04W 8/005* (2013.01); *H04W 12/06* (2013.01)

(58) Field of Classification Search

CPC ....... H04W 4/80; H04W 8/005; H04W 12/06; G06Q 20/3278; G06Q 20/352; H04L 51/04

USPC ........................................................ 455/41.2

See application file for complete search history.

(56) References Cited

U.S. PATENT DOCUMENTS

| | | | | |
|---|---|---|---|---|
| 8,069,169 | B2 * | 11/2011 | Fitzpatrick | G06Q 30/06 707/732 |
| 8,594,292 | B1 * | 11/2013 | Moore | H04M 3/563 709/204 |
| 9,367,860 | B2 * | 6/2016 | McKirdy | G16H 40/67 |
| 10,069,955 | B2 * | 9/2018 | Gerace | H04W 4/023 |
| 10,089,490 | B2 * | 10/2018 | Terada | G06F 21/6245 |
| 10,270,880 | B2 * | 4/2019 | Milbury, Jr. | G06Q 10/10 |
| 10,616,278 | B1 * | 4/2020 | Johansson | G06F 40/134 |
| 10,863,040 | B2 * | 12/2020 | Naito | H04N 1/4406 |
| 11,151,533 | B2 * | 10/2021 | Jones | G06Q 20/204 |
| 11,805,392 | B2 * | 10/2023 | Meyer | H04W 4/023 |
| 12,022,369 | B2 * | 6/2024 | Goel | G06Q 10/40 |
| 2005/0198035 | A1 * | 9/2005 | Sundararajan | H04W 8/005 |
| 2007/0192275 | A1 * | 8/2007 | Foygel | G06F 16/93 |
| 2007/0198533 | A1 * | 8/2007 | Foygel | G06Q 10/10 |

(Continued)

OTHER PUBLICATIONS

First Examination Report in IN202117056559, mailed Jun. 8, 2022, 7 pages.

(Continued)

*Primary Examiner* — April G Gonzales
(74) *Attorney, Agent, or Firm* — Dilworth IP, LLC

(57) ABSTRACT

A system for content sharing and methods for making and using the same. The content sharing system enables a smooth and easy exchange of electronic data.

19 Claims, 46 Drawing Sheets

(56) References Cited

U.S. PATENT DOCUMENTS

| | | | | |
|---|---|---|---|---|
| 2009/0293109 | A1* | 11/2009 | Chu | H04L 63/101 726/6 |
| 2011/0113084 | A1* | 5/2011 | Ramnani | H04W 4/16 709/201 |
| 2013/0032634 | A1* | 2/2013 | McKirdy | G16H 40/67 235/375 |
| 2013/0103946 | A1* | 4/2013 | Binenstock | H04L 63/0492 713/168 |
| 2013/0240618 | A1* | 9/2013 | Hall | G06F 16/9554 235/375 |
| 2013/0311892 | A1* | 11/2013 | Hsieh | G06Q 10/1093 715/738 |
| 2014/0012771 | A1* | 1/2014 | Dunbar | G06Q 30/0279 705/329 |
| 2014/0073252 | A1* | 3/2014 | Lee | H04M 1/72412 455/41.2 |
| 2014/0081797 | A1* | 3/2014 | Rivera | G06Q 20/384 705/26.5 |
| 2014/0091135 | A1* | 4/2014 | Burke, Jr. | G06Q 30/06 235/494 |
| 2014/0126825 | A1* | 5/2014 | Luo | G06V 30/414 382/190 |
| 2014/0154986 | A1* | 6/2014 | Lee | H04W 4/80 455/41.2 |
| 2014/0154987 | A1* | 6/2014 | Lee | H04W 4/80 455/41.2 |
| 2014/0250162 | A1* | 9/2014 | Bell | H04L 67/60 709/201 |
| 2015/0099469 | A1* | 4/2015 | Goldstein | H04W 4/80 455/41.2 |
| 2015/0099550 | A1* | 4/2015 | Alharayeri | H04W 4/21 455/456.3 |
| 2015/0163748 | A1* | 6/2015 | Hrabak | H04W 52/0245 455/41.2 |
| 2015/0227898 | A1* | 8/2015 | Ballout | G06Q 20/065 705/44 |
| 2015/0264723 | A1* | 9/2015 | Cheng | H04W 48/10 455/41.2 |
| 2015/0264731 | A1* | 9/2015 | Lin | H04W 4/21 455/41.2 |
| 2015/0327000 | A1* | 11/2015 | Shin | H04L 69/18 455/41.2 |
| 2016/0012465 | A1* | 1/2016 | Sharp | G06Q 20/321 705/14.17 |
| 2016/0105761 | A1* | 4/2016 | Polo | H04W 4/80 455/41.2 |
| 2016/0135014 | A1* | 5/2016 | Alharayeri | H04W 4/023 455/456.3 |
| 2016/0174022 | A1* | 6/2016 | Nhu | H04W 4/70 455/41.2 |
| 2016/0269979 | A1* | 9/2016 | Ide | H04W 4/80 |
| 2016/0335599 | A1* | 11/2016 | Kawanabe | G06Q 10/109 |
| 2017/0032382 | A1* | 2/2017 | Shulman | G06K 7/10861 |
| 2017/0178104 | A1* | 6/2017 | Fernandez | G06Q 30/0281 |
| 2017/0193468 | A1* | 7/2017 | Chougule | G06Q 20/223 |
| 2017/0272393 | A1* | 9/2017 | Nimushakavi | H04L 12/1822 |
| 2017/0318141 | A1* | 11/2017 | Gerace | H04M 1/27475 |
| 2018/0060017 | A1* | 3/2018 | Lauck | H04M 1/274 |
| 2018/0070208 | A1* | 3/2018 | Alharayeri | H04W 4/023 |
| 2018/0206098 | A1* | 7/2018 | Zarakas | H04W 4/80 |
| 2018/0375982 | A1* | 12/2018 | Gerace | H04M 1/27475 |
| 2019/0020747 | A1* | 1/2019 | Gerace | H04M 1/27453 |
| 2019/0340597 | A1* | 11/2019 | Carlyle | G06Q 20/3224 |

OTHER PUBLICATIONS

International Search Report and Written Opinion in PCT/US2020/032216, mailed Jul. 29, 2020, 6 pages.

Office Action in EP20729435.6, mailed Sep. 5, 2023, 7 pages.

Office Action in EP20729435.6, mailed Mar. 4, 2024, 8 pages.

Office Action in U.S. Appl. No. 16/870,681, mailed Dec. 24, 2021, 15 pages.

Wikipedia, "WebSocket," May 29, 2015. Retrieved from Internet: <URL:https://en.wikipedia.org/w/index.php?title=WebSocket&oldid=664594880>, 7 pages.

Examination Report in EP20729435.6, mailed Aug. 27, 2024, 3 pages.

Exam Report in EP39183.4001, mailed Jan. 3, 2025, 7 pages.

Office Action received for European Patent Application No. 20729435.6, mailed on Jan. 3, 2025, 7 pages.

Office Action received for EP Application No. 20729435.6, mailed on Jul. 14, 2026, 9 pages.

Complaint filed by *GG Technologies Inc. D/B/A Staytouch* vs. *Apple Inc.*, of Case 6:26-cv-00237-JKP-DNM, Document 1, filed by Apr. 10, 2026, 106 pages.

Defendant and Counterclaimant Apple Inc's Answer filed by *GG Technologies Inc. D/B/A Staytouch* vs. *Apple Inc.*, of Case No. 6:26-cv-00237-JKP-DNM, Document 28, filed on Jun. 25, 2026, pp. 1-15.

* cited by examiner

Fig. 5D
Edit this profile
Copy this profile link
Invite friends
Share with existing StayTouch contacts
Share vCard Email
Delete profile

Fig. 7

700

| | Database Record Attributes | State of the contact link | | | | |
|---|---|---|---|---|---|---|
| | | *contact_created* | *A_has_rejected* | *A_has_accepted* | *B_has_accepted* | *B_has_rejected* |
| | sender_accepted | FALSE | | TRUE | . | . |
| | receiver_accepted | FALSE | | . | TRUE | FALSE |
| **Contact_A_to_B** | pending | TRUE | Contact_A_to_B deleted | . | FALSE | FALSE |
| | | | | | | |
| | sender_accepted | FALSE | . | . | TRUE | |
| | receiver_accepted | FALSE | FALSE | TRUE | . | |
| **Contact_B_to_A** | pending | TRUE | FALSE | FALSE | . | Contact_B_to_A deleted |
| | | | | | | |
| | | | | | | |
| **Contact appears in pending list** | | if as a receiver of contact pending is true | | | | |
| | | | | | | |
| **Contact appears in contact list** | | if as a sender of contact, sender has accepted AND it was not an automatically created contact from manually entered data | | | | |
| | | if as a receiver of contact, receiver has accepted AND sender has also accepted | | | | |
| | | | | | | |
| **Data inside the shared profile is visible** | | if as a receiver of contact, receiver has accepted AND sender has also accepted | | | | |

Fig. 10B
9:41 AM
All contacts
A
Adelaide Léon
Adelia Jordi
Adrien Tali
Alexander Plant
Alecia Sweet
Benoit Carreau Renond
Benedict Canderam
Alexander Plant

Fig. 13E
6:04
Past conference
Edit
Overview
Participants
Message board
Thursday, 13 February 2020
This conference is to gather and discuss the further steps on design and development process of the application
03:30
.docx
Enter text here
Host
Martin Kuerbs
Maddy Johnson
Kate Roberts
Robin Champ
Lisa Cantor

Fig. 15
2:46
Account
My documents
Events
Language
Import contacts
Invite friends
Discover friends
How to StayTouch
Newsletters
Notifications
Help
Legal
Log Out

METHOD AND SYSTEM FOR PROXIMITY-BASED CONTACT TRANSFER

CROSS-REFERENCE TO RELATED APPLICATIONS

This application is related to and claims priority to U.S. patent application Ser. No. 16/870,681, which was filed May 8, 2020, which application claims priority to U.S. Provisional Patent Application No. 62/845,753, which was filed May 9, 2019. The disclosures of the Patent Applications are herein incorporated by reference in their entirety and for all purposes.

FIELD

The present disclosure relates to systems and methods for sharing electronic content and data management. More specifically, but not exclusively, the present disclosure relates to a system and method for proximity-based data transfer.

BACKGROUND

Physical business cards can help professionals network and share contact information. However, to produce a business card, it needs to be purchased, designed, printed, and always carried around. When contact information is updated or cards run out, the process repeats.

Furthermore, although traditional methods of exchanging contact information (e.g., physical business cards) have their place, exchanging electronic contact information is growing in popularity. The modern content sharing platform includes various applications, such as, short message service (SMS) text messages, electronic mail (e-mail), near-field communication (NFC) (e.g., AirDrop from Apple®), standard Bluetooth, social media platforms (e.g., Facebook® Messenger, WhatsApp®, Twitter®, Facebook®, LinkedIn®, and so on), wireless-fidelity (wi-fi), quick response (QR) codes (e.g., WeChat®, Camcard®), and so on. With one of these applications installed on your phone, a digital fingerprint can be exchanged.

However, while these platforms provide a unique way of sharing content with another person, they cannot provide a seamless user experience. For example, these platforms cannot provide a seamless method for scanning nearby devices, filtering those scanned devices, pairing a selected device, and bidirectionally exchange data between the paired devices. Some conventional solutions also rely on physical gestures (e.g., shaking the phone) so that the phone's accelerometer can trigger a connection. Often, even after a connection, these platforms can accidentally disconnect and the process must be repeated. Once connected, conventional solutions then require on-screen navigation through complicated applications, such as by clicking through photos or filtering through an electronic contact book. Unless the connection is then manually disconnected, conventional platforms do not disconnect devices, thereby draining power and wasting resources of mobile devices.

Even further, these conventional solutions are not always secure. In some cases, the conventional application allows the user to limit whether they can exchange electronic information with only contacts or with anyone. Limiting digital exchanges to only contacts defeats the purpose of exchanging digital contact information with new users. In other words, this requires a manual exchange of contact information before any digital information can be sent. But, allowing communication with all contacts can be unsafe. When scanning for a target phone to exchange information with, multiple phones are often detected based on proximity. This means that users can inadvertently share digital information with all detected phones within proximity at the accidental click of a button. Often, there is no recourse to undo this action.

In fact, conventional solutions typically do not allow users to control the distance that phones are detected. This is typically defined by the limits of the communication medium (e.g., Bluetooth proximity or NFC ranges). Conventional solutions that rely on NFC require the two phones to be in very close proximity. And conventional NFC-based data exchange is very slow for two-way communication (the exchange for conventional NFC-based systems is a single direction at a time), which is not ideal for quick networking and exchanging contact information.

As a further disadvantage, conventional applications diminish the user experience as there is a set-up required. Some require a physical scan of a QR code or a request to message over a social media platform. This can include accessing the camera, generating the QR code, pointing the camera to read the code/card/phone, and so on.

For standard Bluetooth, the devices first need to be paired, taking time and effort. To share contacts with multiple users, each device needs to be separately paired. But any existing connection needs to be first unpaired before pairing with a new device. This is not practical, for example, at a public setting when trying to exchange contacts quickly Similarly, for wi-fi, the devices need access to a common network. Security is quickly lost on public networks. In other examples, conventional content sharing application typically require a socket to communicate, thereby requiring a server. This means that data transfer can occur only when the server and/or both users are online.

Other conventional solutions require that smart devices (e.g., phones or tablets) are brought into physical contact with one another, thereby limiting content sharing with another user at a time. Sharing with multiple users becomes time consuming and inefficient. Even further, these solutions fail to address the desire for contactless data solutions in the modern world.

In view of the foregoing, a need exists for an improved system for data exchange in an effort to overcome the aforementioned obstacles and deficiencies of conventional content management methods.

BRIEF DESCRIPTION OF THE DRAWINGS

FIG. 7 is an exemplary screenshot illustrating one embodiment of a profile database record of the content sharing system of FIG. 1.

Figure 1:
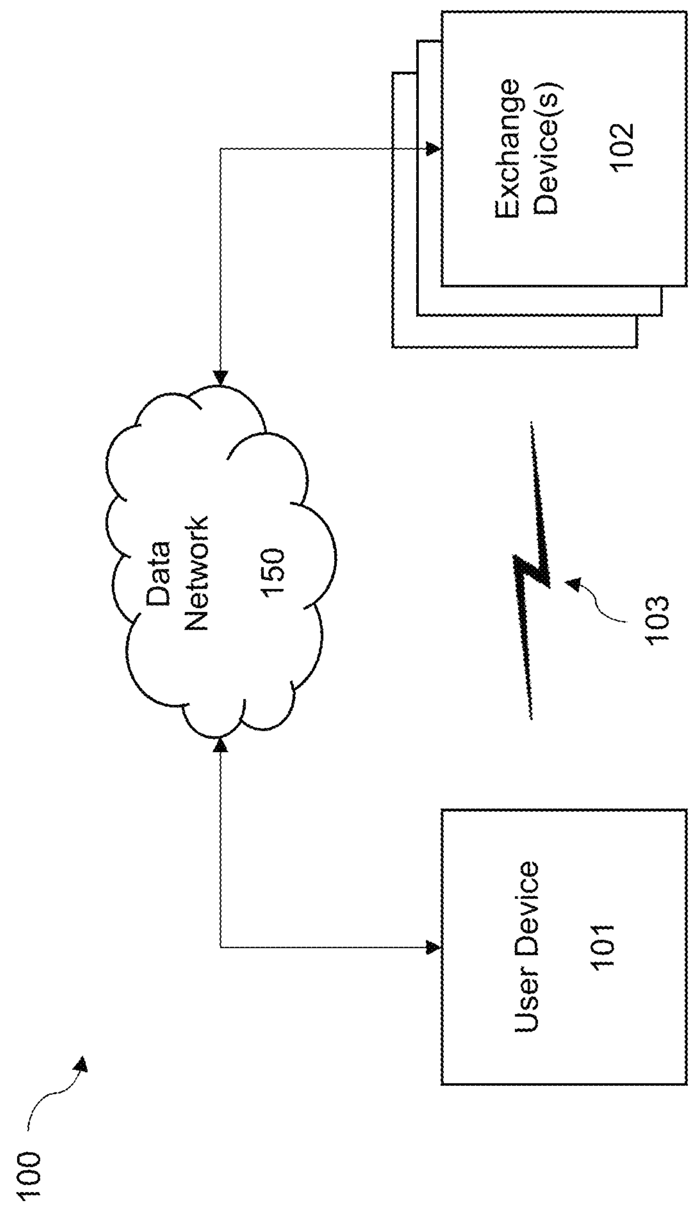
FIG. 1 is an exemplary top-level block diagram illustrating one embodiment of a content sharing system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

The present disclosure describes a number of methods and computerized systems for electronic content sharing. Since currently-available data exchange systems and methods are deficient because they require some set-up (e.g., physical scanning of mobile devices), are not secure, are not contactless, cannot operate in an offline mode, and cannot automate data content transfers, a system for electronic content sharing can prove desirable and provide a basis for a wide range of electronic data management, such as exchanging electronic contact information with business or personal networks using a market disruptive approach with only mobile telephones without the need of a scan, an analysis of QR codes, or exchange of physical business cards (or any physical contact). This result can be achieved, according to one embodiment disclosed herein, by a content sharing system 100 as illustrated in FIG. 1.

The content sharing system 100 advantageously manages contact information, maintains different profiles, creates a history to every meeting (whether professional or personal), and enables access to all this information (meeting minutes, frequencies, creating follow ups) with the help of few clicks, thereby providing the most user-friendly experience and highly innovative intuitive design.

The content sharing system 100 enables a seamless approach for exchanging contact information, for example, with a business or personal network. For example, the content sharing system 100 can detect one or more mobile devices, filter connected devices, apply distance-based limitations, and automatically connect with those filtered devices without the need for manual intervention. Multiple profiles can be shared. In some embodiments, profiles can be marked as private or public. The content sharing system 100 shares digital information in a safe and secure manner.

Turning to FIG. 1, the content sharing system 100 enables a user device 101 to communicate directly (via a proximity-based communication channel 103) and/or indirectly, such as through a data network 150, with one or more exchange devices 102.

In some embodiments, the user device 101 and/or the exchange devices 102 can include any number of mobile devices, such as smart phones, tablets, and computers.

In some embodiments, the user device 101 can exchange any electronic content, such as electronic contact information, with the one or more exchange devices 102. Additionally and/or alternatively, the electronic content can include, documents, messages, electronic files, audio, video, text files, links (e.g., Uniform Resource Locators (URLS)) to the electronic content, and/or any combination thereof.

The user device 101 and/or the exchange devices 102 each can include a communication subsystem (not shown) for wired and/or wireless electronic data exchange, such as over the data network 150.

Suitable wireless communication networks can include any category of conventional wireless communications, for example, radio, Wireless Fidelity (Wi-Fi), cellular, satellite, and broadcasting. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In some embodiments, the wireless communications between the subsystems of the content sharing system 100 can be encrypted, as may be advantageous for secure applications. Suitable encryption methods include, but are not limited to, internet key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and the like. Encryption methods specifically designed for content sharing systems may also be suitable.

Thus, existing wireless technologies for use by current telecommunications endpoints can be readily adapted for use by the user device 101 and/or the exchange devices 102. For example, by outfitting each user device 101 and/or exchange device 102 with a wireless card like those used for mobile phones, or other suitable wireless communications hardware, additional devices 101/102 can easily be integrated into existing networks. Alternatively, and/or additionally, proprietary communications hardware can be used as needed.

In some embodiments, the content sharing system 100 enables the user device 101 to communicate directly via the proximity-based communication channel 103 with the one or more exchange devices 102. The proximity-based communication channel 103 can include peer-to-peer radio communications, such as near field communications (NFC) between the user device 101 and the one or more exchange devices. By way of example, Android Beam® can provide short-range contactless data transfer via NFC. In some embodiments, the NFC can also include AirDrop from Apple®, standard Bluetooth, wireless-fidelity (wi-fi), quick response (QR) codes, sound waves, microwaves, and so on. For example, the user device 101 can emit ultrasonic sound that is imperceptible to humans that can be detected by the one or more exchange devices 102 (e.g., Google Nearby) to establish an NFC communication channel.

In a preferred embodiment, the proximity-based communication channel 103 can include Bluetooth communication, such as Bluetooth Low Energy (or Bluetooth LE/BLE). Bluetooth LE advantageously enables peripherals to communicate by consuming less energy than other Bluetooth communication. Furthermore, the users of either the user device 101 and/or the exchange devices 102 do not need to manually pair their device 101/102 using system settings. The user device 101 and each exchange device 102 can define usage description keys to enable the contactless exchanged described herein. By way of example, the user device 101 can maintain an information property list file that includes structured text defining configuration information for various applications that can be run as bundled executables. For example, on an Apple iPhone®, an "Info.plist" file includes at least a privacy message that defines why an application is requesting the ability to connect to Bluetooth peripherals (e.g., an "NSBluetoothPeripheralUsageDescription" string) and associated descriptions for electronic contact files. In some embodiments, the content sharing system 100 can also recognize devices (e.g., exchange devices 102) that have already been paired before (e.g., with the user device 101) to avoid creating duplicate contacts. Advantageously, the content sharing system 100 does not require users to make unnecessary physical gestures or manually pair their devices—with or without codes—and avoids unintentional pairing/unpairing.

As used herein, the user device 101 and each exchange device 102 can be characterized as a peripheral or a central. The peripheral is a device that exposes services and data for reading and/or writing. The central is a device that connects to the peripherals to read/write data exposed by the peripherals. The central initiates the connection to the peripheral.

Figure 2:
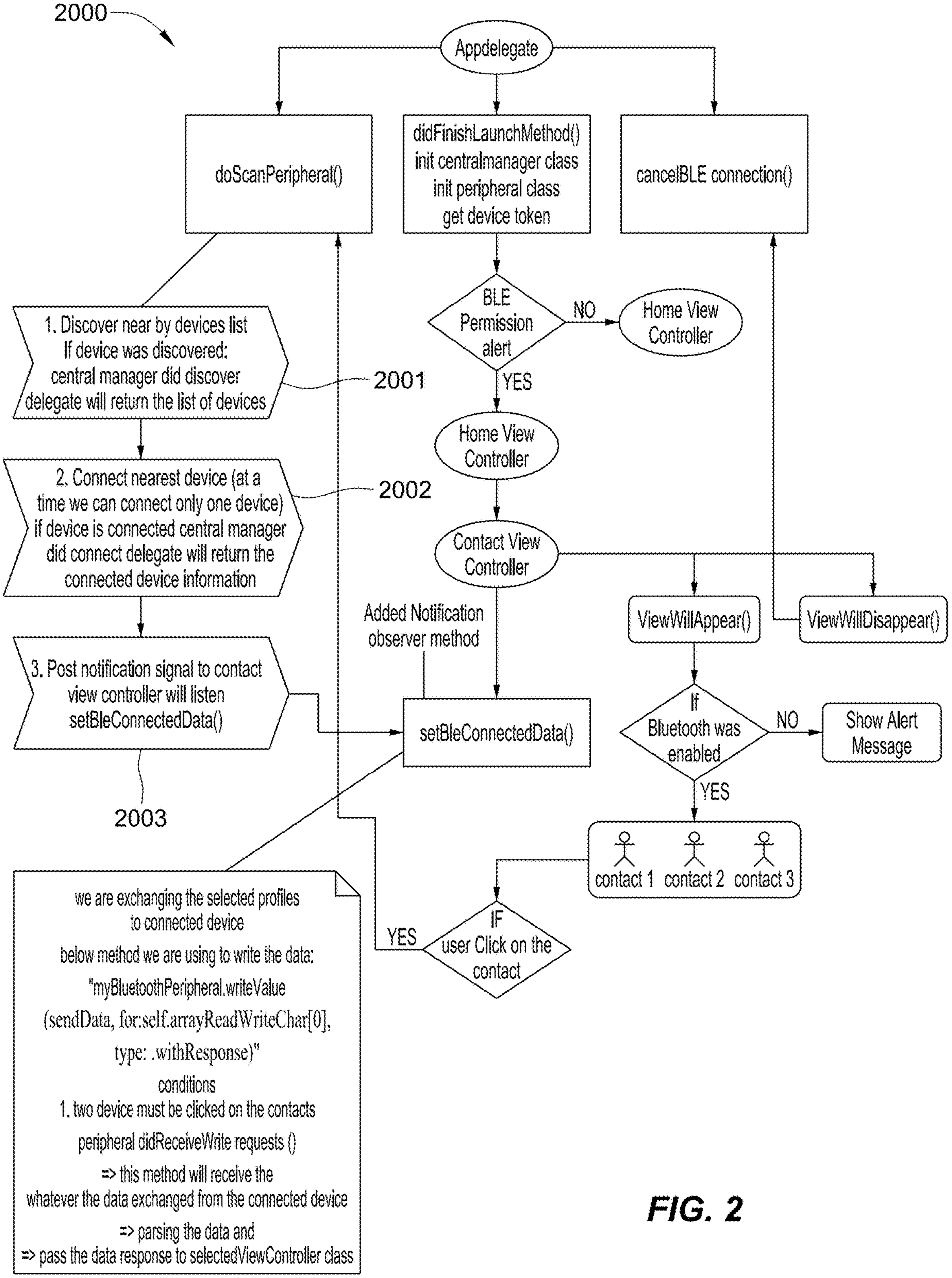
FIG. 2 is an exemplary flow diagram illustrating one embodiment of a workflow process for establishing the near-field communication of the content sharing system of FIG. 1.

The user device 101 can communicate directly via the proximity-based communication channel 103 with the one or more exchange devices 102 in any manner described herein, such as using an exemplary workflow 2000 shown in FIG. 2.

Turning to FIG. 2, the user device 101 scans for nearby devices from the one or more exchange devices 102, at step 2001. A selected device is identified from the one or more exchange devices 102. In some embodiments, the selected device is identified based on a predetermined proximity, for example, using the closest device. In some embodiments, the closest device can be determined by the device providing the user device 101 with the strongest received signal strength indicator (RSSI) signal. Additionally and/or alternatively, more than one device can be selected within a certain distance of the user device 101. In some embodiments, users can define the range for detection of exchange devices 102 to add other users in proximity.

Once the selected device is identified, an option to tap on the profile is displayed on the user device 101 to connect to the exchange device 102, at step 2002. Additionally and/or alternatively, the selected exchange device 102 can initiate the connection from an option to tap on the profile of the user device 101 that is displayed on their exchange device 101. Once connected, a login identifier (ID) and a profile ID for each of the user device 101 and the selected exchange device 102 are exchanged with one another. In some embodiments, a company ID can also be used as a digital company signature. After this information is exchanged, a contact will be created and marked as "pending" on each device 101/102, at step 2003. Once the users of each the user device 101 and the selected exchange device 102 mutually accept, the profile data will be displayed on each contact detail screen as described herein.

In a preferred embodiment, the content sharing system 100 can provide an application on a mobile device, which may be provided for download or supplied with the user device 101 and/or the exchange devices 102.

The mobile application can enable the features described herein. For example, through the mobile application, the user device 101 and the exchange devices 102 can present a graphical user interface for implementing various features described herein.

Figure 3A:
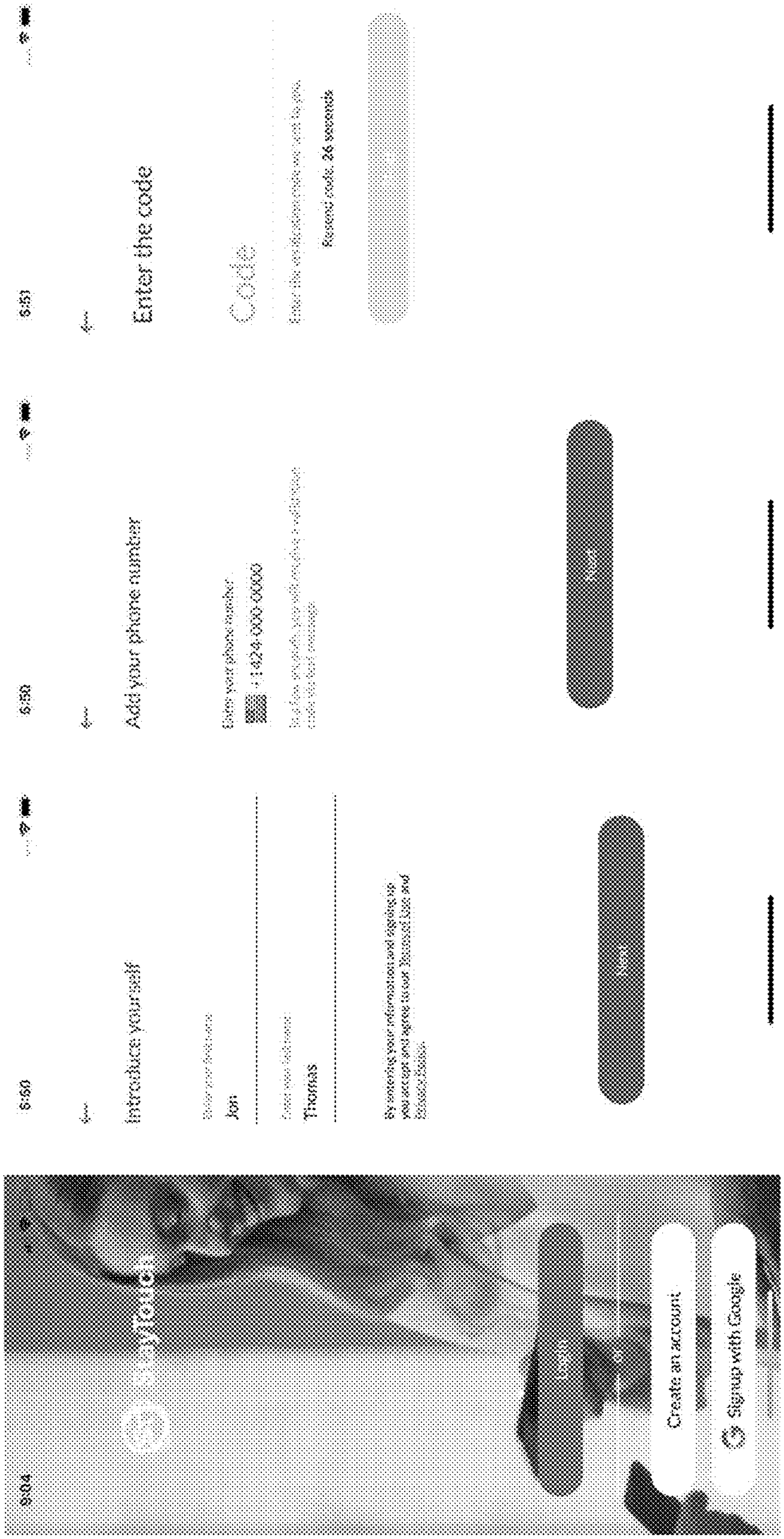
FIG. 3A shows exemplary screenshots illustrating one embodiment of a workflow for presenting one or more user interfaces for registering with the content sharing system of FIG. 1.
Figure 3B:
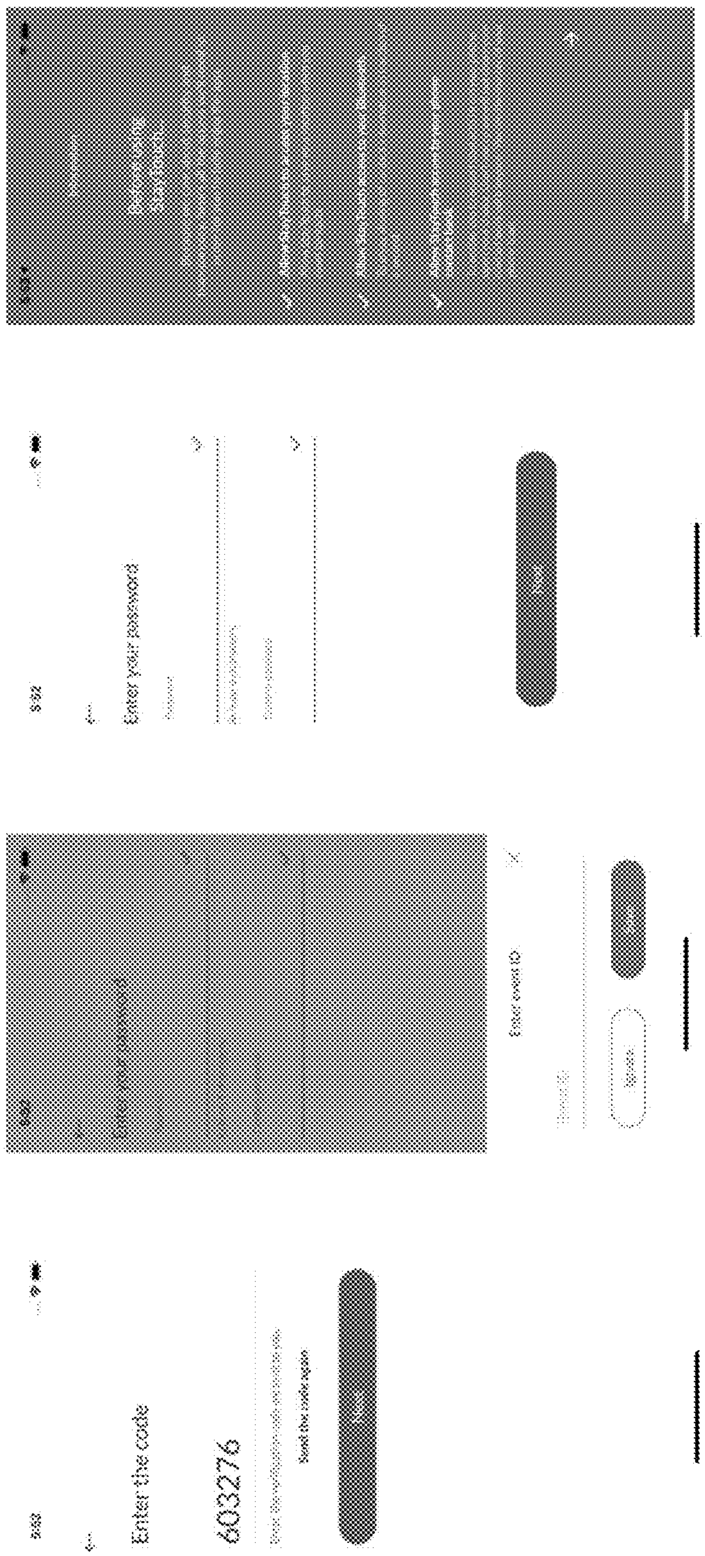
FIG. 3B shows exemplary screenshots illustrating another embodiment of the workflow of FIG. 3A for presenting one or more registration user interfaces.

A user can register with the content sharing system 100 in any manner described herein. For example, FIGS. 3A-C illustrate an exemplary workflow for navigating through one or more user interfaces during an onboarding process. Turning to FIG. 3A, through the mobile application on either the user device 101 or the exchange device 102, the user first enters their name and a mobile telephone number to be verified by the content sharing system 100. In some embodiments, the user can be first associated with their user device 101 or exchange device 102 by authenticating the mobile telephone number. The content sharing system 100 can verify the mobile telephone number by sending a code or one-time-password (OTP) to the mobile number, such as via SMS, which the user can then enter in the mobile application, as shown in FIG. 3A. This authentication advantageously confirms that the user is in possession of the user device 101 and/or the exchange device 102 before using the features thereof.

In some embodiments, once the mobile telephone number has been authenticated, the user is then asked to create a password to initiate their user account, such as shown in FIG. 3B. Once validated and the user chooses a password, the user is registered with the content sharing system 100.

Figure 4:
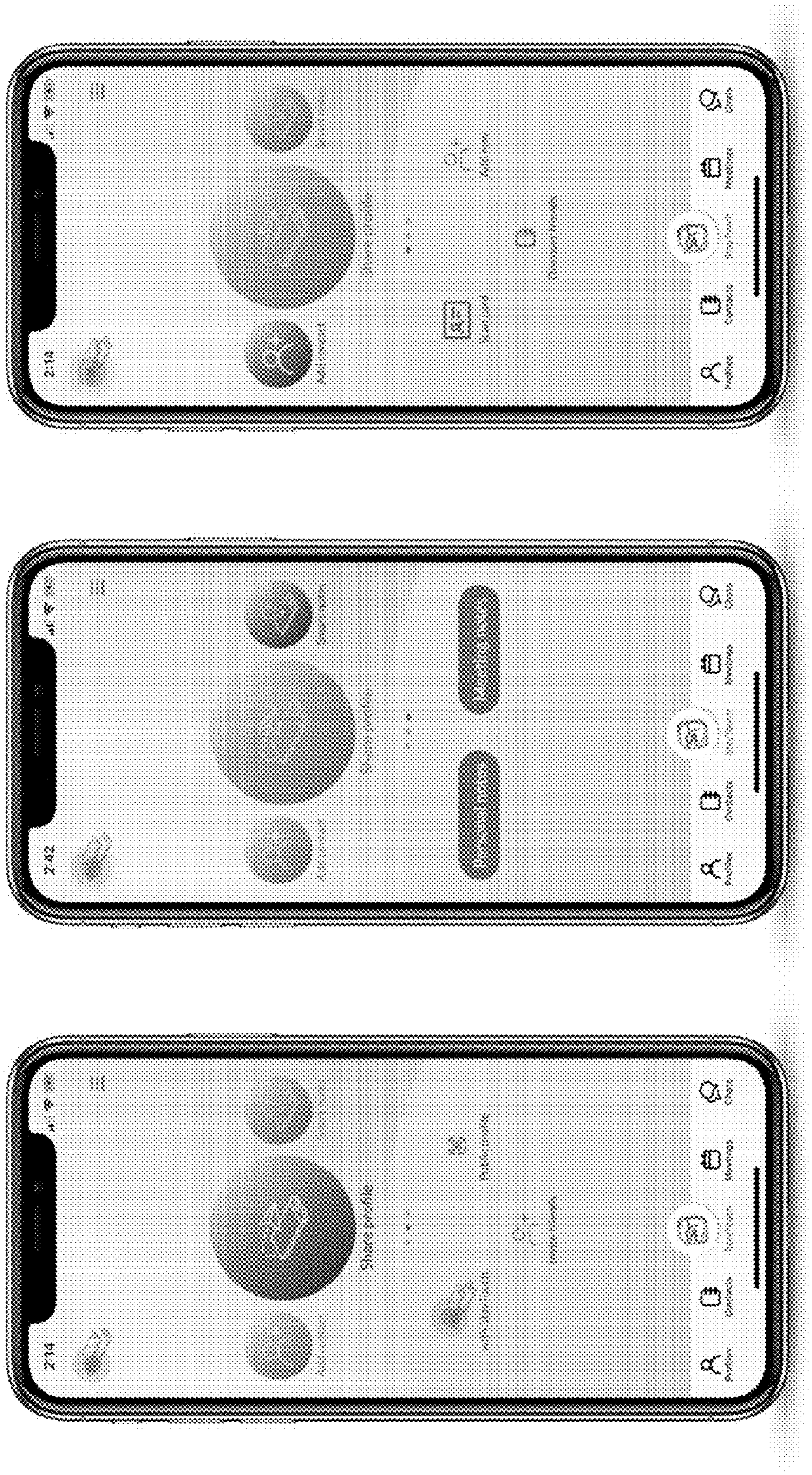
FIG. 4 is an exemplary screenshot illustrating one embodiment of a user interface for presenting a home page using the content sharing system of FIG. 1.

The mobile application can include a home page, such as shown in FIG. 4. Once the user has registered, the home page can be displayed to the user each time the user launches the mobile application. With reference to FIG. 4, the home screen enables the user to immediately share their contact information, add a contact, take smart notes, and/or manage their application. Stated in another way, the home screen allows the user to navigate through the various features described herein. As shown, the home screen can link to other mobile web pages, such as a "meetings" link that redirects to a selected user's upcoming meetings for the day, past events, and notes. In some embodiments, a status screen can also be displayed for any pending invitation with other users of the content sharing system 100.

After the user account is created, the user can interact with other users of the content sharing system 100. In some embodiments, the account creation includes generating a unique device ID associated with the registered device to be maintained in a central server (not shown) of the content sharing system 100. The central server can reside on the data network 150 and/or at some remote location in operable communication over the data network 150.

Figure 5A:
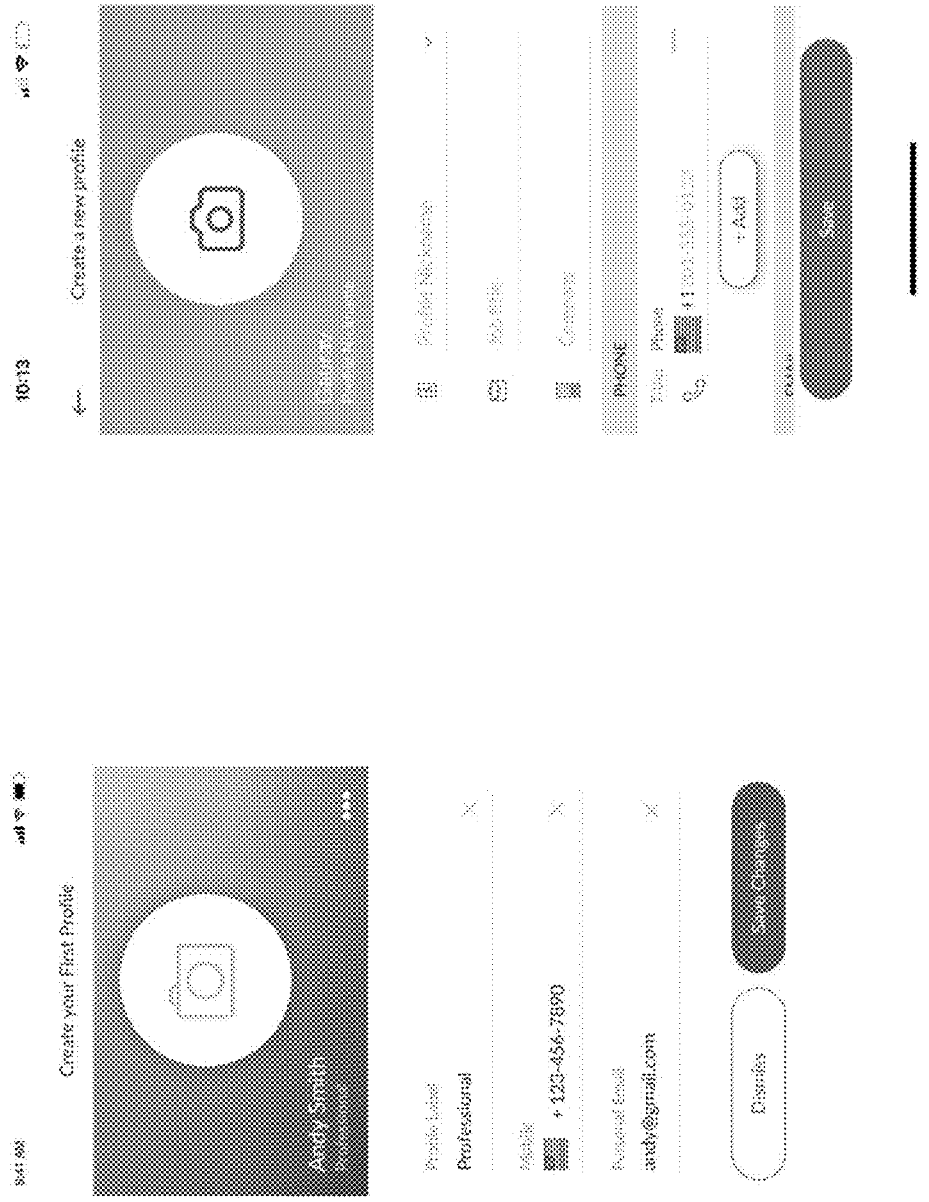
FIG. 5A shows exemplary screenshots illustrating one embodiment of a workflow for presenting one or more user interfaces for creating user profiles with the content sharing system of FIG. 1.
Figure 5B:
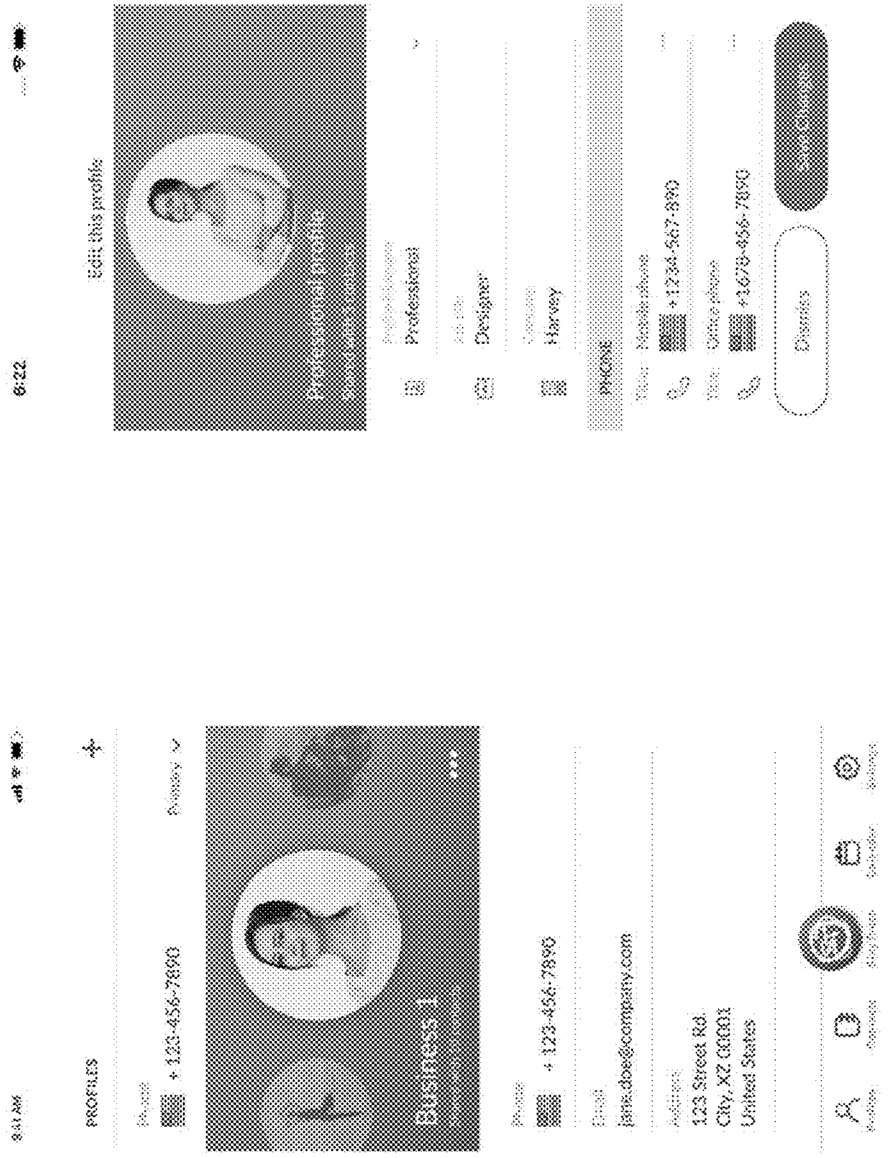
FIG. 5B shows exemplary screenshots illustrating one embodiment for presenting one or more user interfaces showing user profiles created using the workflow shown in FIG. 5A.
Figure 5C:
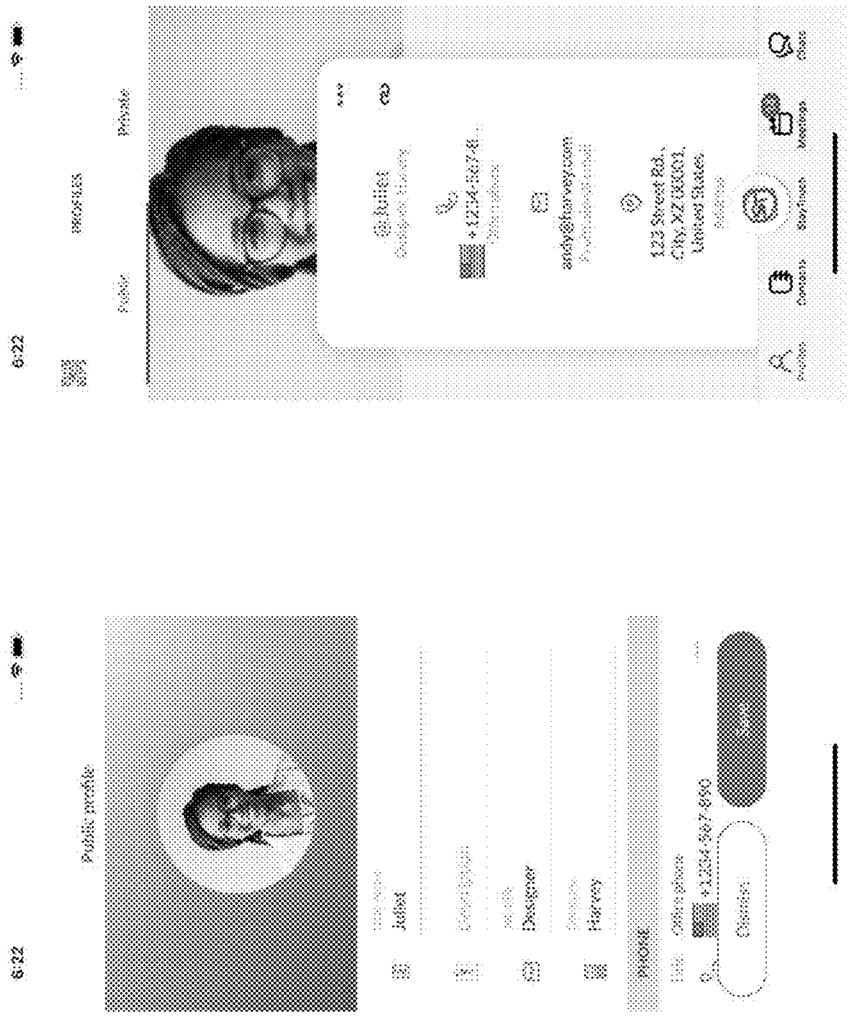
FIG. 5C shows exemplary screenshots illustrating one embodiment for presenting one or more user interfaces showing user profiles created using the workflow shown in FIG. 5A.
Figure 5D:
FIG. 5D shows an exemplary screenshot illustrating one embodiment for presenting one or more user interfaces to modify the user profiles created using the workflow shown in FIG. 5A.

Additionally and/or alternatively, the user can edit their own profile that is maintained in the central server, such as shown in FIG. 5A. Users can also add a profile nickname, a current position, a company, work status, additional phone numbers, additional e-mail addresses, physical addresses, date of birth, dates, social networks, and other information that the user wants to share. In other words, the user inputting his data maintains his own privacy and is the single owner of his data. The completed profile is shown in FIG. 5B. Once completed, the home screen can also display the user's own profile. In some embodiments, a virtual card can be displayed to represent a user's profile, as shown in FIG. 5C. Additional options for managing the user profile is shown in FIG. 5D.

Each profile of the content sharing system 100 can include a name, a photo (or silhouette), and contact details around the photo. Additional information and/or contacts can be imported from the user's existing phonebook and/or contact list. In some embodiments, once a user registers with the content sharing system 100, a central server (not shown) can broadcast updates to confirm that the profile information received on a local client device 101 is consistent with a central database maintained at the central server. Similarly, the user can authorize the content sharing system 100 to synchronize their own personal contact information with the information on the central server, which can be maintained in an encrypted disk of the central database. In a preferred embodiment, a batch call using a batch file and/or a set of programs processed in a batch mode can be used to synchronize the contact information on local devices and the central server.

Figure 6A:
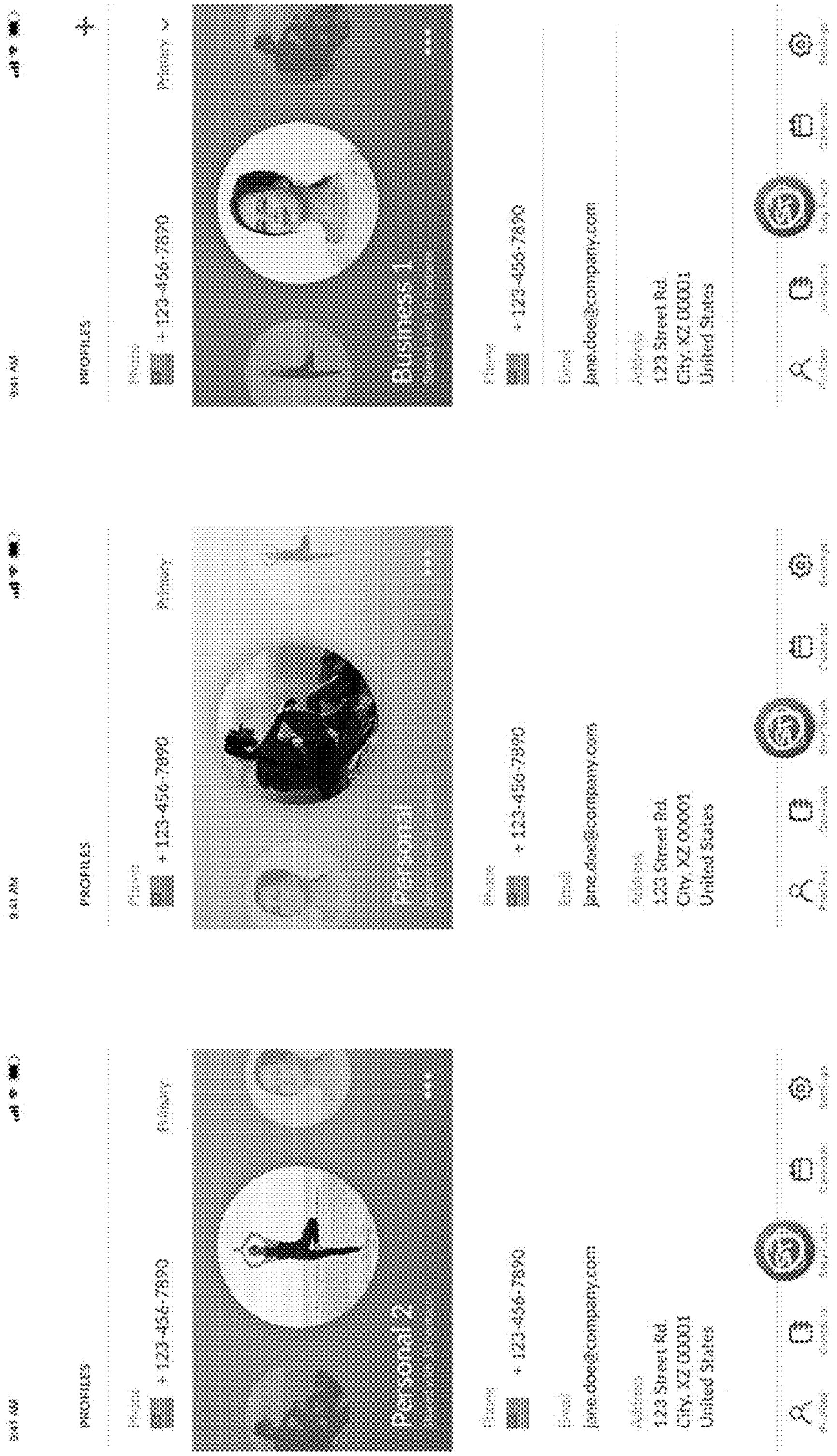
FIG. 6A is an exemplary screenshot illustrating one embodiment of a user interface showing a user profile using the content sharing system of FIG. 1.

In some embodiments, a single user can have one or more profiles within the content sharing system 100. For example, the user may want to selectively share some information with a first subset of contacts and other information with a second subset of contacts. To better distinguish multiple user profiles, the content sharing system 100 can highlight different profiles with a unique color ring around the photo and/or a uniquely colored background to better distinguish between profiles, such as shown in the user interface of FIG. 6A. Advantageously, unique color-coding can better differentiate what is being shared between users to avoid sending or sharing information with the wrong recipient and/or sharing wrong information with the correct recipient. For example, as shown in FIG. 6A, if user A has multiple profiles and shares three of these profiles with user B, user A will appear in the contact list of user B. Each profile for user A can be identified by different colors. In some embodiments, each color can be associated with a different profile. Therefore, user B can advantageously identify those profiles for user A from whom multiple profiles have been shared.

Profiles can be swiped across the screen making the visual identify of each profile recognizable (such as shown in FIG. 6A). In some embodiments, the picture and/or the contact information associated with the picture can be swiped. The contact information (e.g., text) can be associated with a photo and represent a unique profile.

Figure 6B:
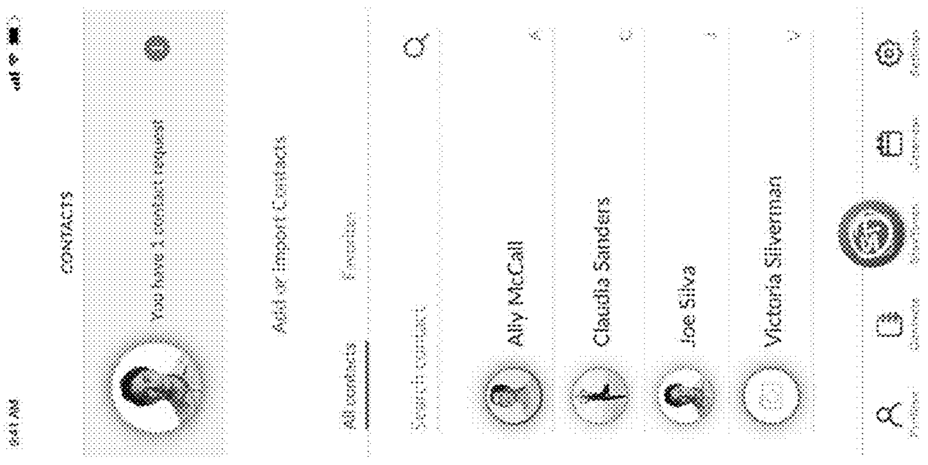
FIG. 6B is an exemplary screenshot illustrating another embodiment of the user interface of FIG. 6A.

In some embodiments, the contact information for any number of users, such as shown in FIG. 6B, can be stored in a relational database table (not shown). Any media that is associated with a selected profile (e.g., a profile image, contact information, electronic card, and so on) can be identified by a reference key associated to the selected profile. By way of example, an exemplary user profile entry of the relational database can include:

```
    Profile Record 1 [id:589, user_id:362, title:public, type:custom, data:{version1,
versionData}:{key:GG}:{phone value +44555567876}:format:PHONE NUMBER] "}, {"key":
"undefined", "title": "Email", "value": "test@gmail.com", "format": "EMAIL"}, {"key":
"undefined", "title": "Facebook", "value": "fab", "format": "SOCIAL_MEDIA"}, {"key":
"undefined", "title": "Position", "value": "organizer", "format": "JOB_TITLE"}, {"key":
"undefined", "title": "Company", "value": "test", "format": "ORGANIZATION"}],
"publishChanges": false}]
    created_at | 2019-04-19 08:01:59.908954+00
    updated_at | 2019-04-19 08:01:59.908954+00
    [ MEDIA ATTACHMENT RECORD 1 ]------------------------
    id                         | 1206
    user_id                    | 362
    non_app_contact_id         | <null>
    event_id                   | <null>
    profile_id                 | 589
    storage_folder             | profile-images
    storage_key                | 30b6e004da9448365313526d19787c9266dad41d
    size                       | 0
    contents                   | <null>
    is_synced_with_file_store  | False
    type                       | PROFILE_IMAGE
    access_level               | PUBLIC
    created_at                 | 2019-04-19 08:01:59.908954+00
    updated_at                 | 2019-04-19 08:01:59.908954+00
    user_id_of_contact         | <null>
```

Figure 6C:
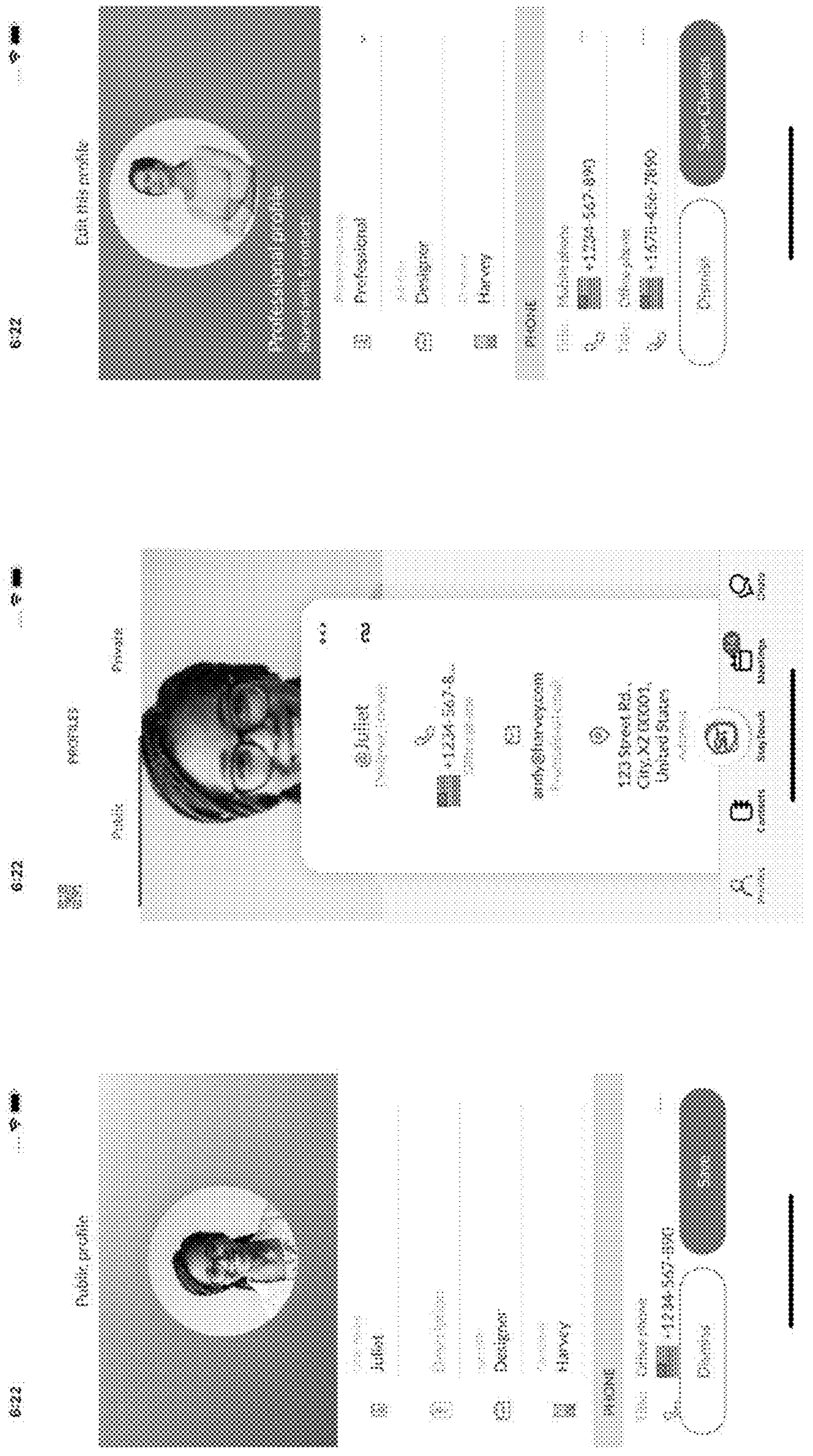
FIG. 6C is an exemplary screenshot illustrating another embodiment of the user interface of FIG. 6A.

Additionally and/or alternatively, for users that have one or more profiles within the content sharing system 100, each profile can be identified as a "public" or a "private" profile. In a preferred embodiment, a single user is allowed one public profile and can have one or more private profiles. As previously described, the user may want to selectively share some information with a first subset of contacts and other information with a second subset of contacts. The use of a public or private flag associated with a selected user profile can better prevent accidental content sharing of private information. With reference to FIG. 6C, a user interface for creating a public profile is shown.

In some embodiments, creating a public profile generates a specific public username for the user. The public profile is then associated with a public page link based on the public username. By way of example, assume a user A creates a first profile and chooses usernameA (which the content sharing system 100 confirmed is available). The user A can also have an associated public page such as www.[domain-name].com/@usernameA. This page can be shared publicly as a signature or a link with anyone who may not be registered with the content sharing system 100. Because this page can be accessible by the public, the information on the page is also public. In other words, anyone who visits the public page can access the information, view/download a virtual card with the public information, and/or download the mobile application to register with the content sharing system 100.

Alternatively, the profile can also be flagged as a private profile. For private profiles, content is only shared when a user sends and/or accepts share requests, as discussed herein. In some embodiments, private profiles can also be shared using unique links as discussed in relation with public profile usernames. However, the unique link is not publicly accessible. Instead, the private link redirects users to the mobile application and requires confirmation from the sender of the link to connect with the user.

As described above, profiles can be marked and/or flagged as shared in any manner described herein, such as using a table 700 shown in FIG. 7. As shown in FIG. 7, once a profile record is created in the database, the profile record includes references to one or more shared contacts. In some embodiments, a separate record is created for each profile shared with the contact.

In some embodiments, contacts and profiles shared with the contact can be represented as separate data structures in the database. By way of example, assume user A shares profile P1 with user B. A contact C1 can be created in a first table. In a separate contact profile reference table, an entry is created that includes an association between the contact C1 and the profile P1. If user B shares their profile P2 with the user A, then two additional database entries are created:

a contact entry C2 with the sender as user B and the receiver as user A; and a contact profile reference table entry linking C2 with P2.

Figure 8A:
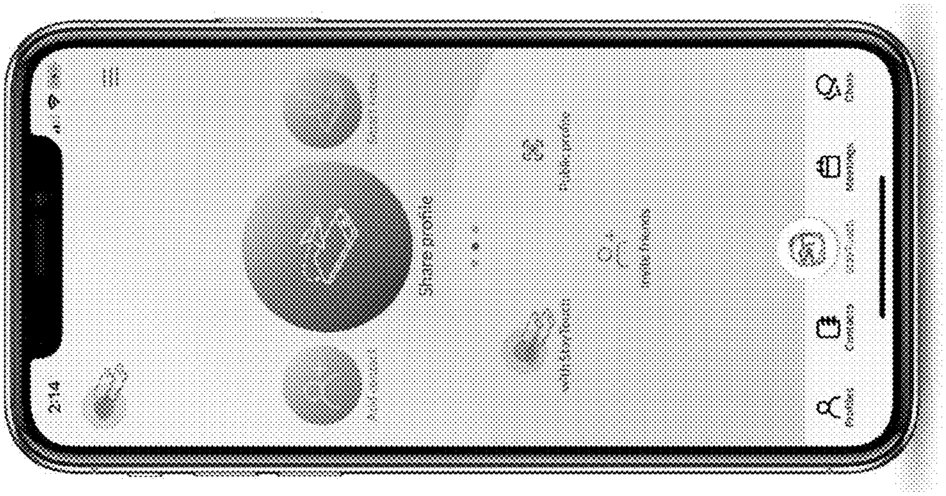
FIG. 8A is an exemplary screenshot illustrating one embodiment of a user interface for sharing a contact using the content sharing system of FIG. 1.
Figure 8B:
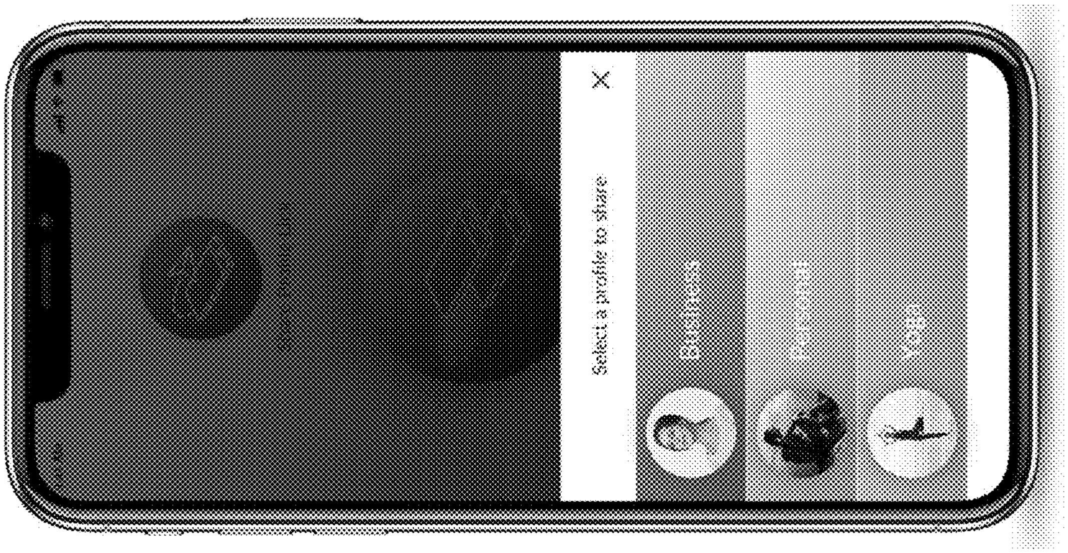
FIG. 8B is an exemplary screenshot illustrating another embodiment of the user interface of FIG. 8A.
Figure 8C:
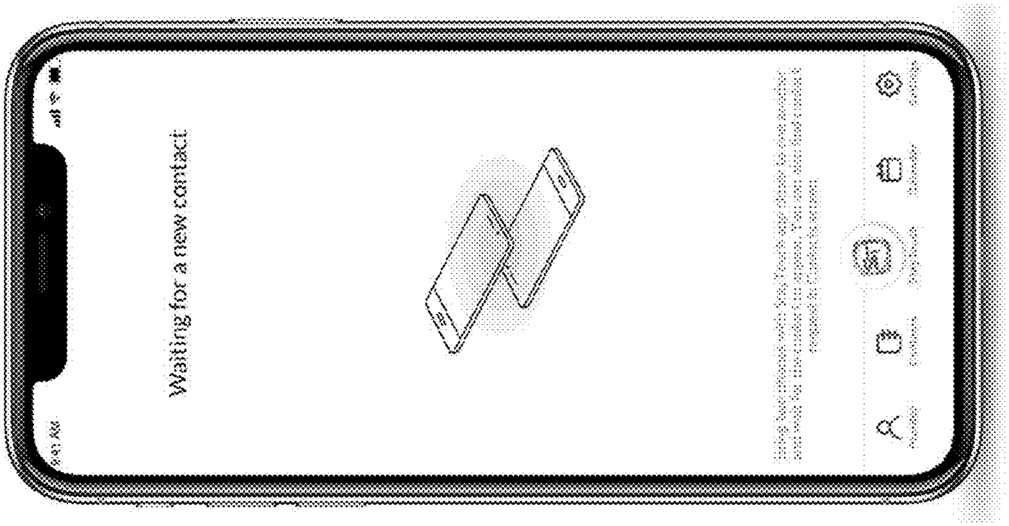
FIG. 8C is an exemplary screenshot illustrating another embodiment of the user interface of FIG. 8A.

Users can interact with one another through the content sharing system 100 by using the proximity-based communication 103 described herein. For example, during a meeting, each user can select a profile to share on their device 101/102 via the proximity-based communication 103 (e.g., Bluetooth LE). During the in-person meeting, both users can open their mobile application on their device 101/102, such as shown in FIG. 8A. In one example, assume a first user A desires to share a first profile P1 with a second user B; and the second user B wants to share their profile P2 with the first user A. The mobile application can present a user interface for selecting the appropriate profile to share, such as shown in FIG. 8B. At this stage, neither user can see the other user in their contact list. Once the user device 101 detects that a selected exchange device 102 that has registered with the content sharing system 100 is within close-proximity (e.g., within about 300 feet), the profile ID (e.g., the ID of the profile you want to share from your account) and the user ID (e.g., the ID of the logged in user) is exchanged between the user device 101 and the selected exchange device 102 as described herein. While waiting for both devices to come within a predetermined range, a status screen such as shown in FIG. 8C, can be shown.

Figure 8D:
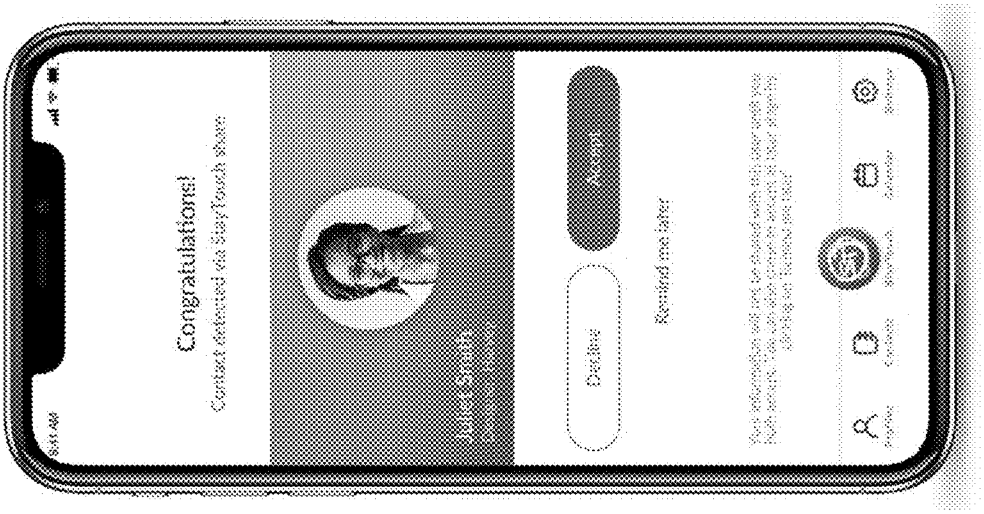
FIG. 8D is an exemplary screenshot illustrating another embodiment of the user interface of FIG. 8A.

In a preferred embodiment, the proximity-based communication 103 is closed once this initial exchange occurs. Once this exchange happens, a contact is created with the profile ID and marked as initially "pending." In other words, the profile is not actually shared between users unless both users accept the sharing. Therefore, an option is provided to each user to activate the mutual contact exchange. Users can choose to accept or decline this invitation to share information, such as on a user interface shown in in FIG. 8D.

In some embodiments, once the Bluetooth settings of their device is turned on discovery, the user does not need to manually pair any devices and does not need any additional pairing codes. The disclosed systems and methods advantageously avoid manually scanning for devices and pairing those devices to exchange electronic data.

If both users do not accept this link, the pending invitation is removed and the proximity-based communication 103 is closed. For example, assume the second user B accepts the pending contact invitation with the first user A. The first user A now appears in the contact list of the second user B, but the entry for user A is empty until the first user A mutually accepts the invitation from the second user B. Once accepted, the profile for P1 is flagged as shared with the second user B, despite the first user A not having the user B in their contact list and the data of profile P2 will not fully be available. If the first user A rejects their pending contact invitation with the second user B, the pending contact request is removed from the user device 101 of the first user A. User B will continue to see P1 for user A in their contact list, but the entry for P1 will include a null set of data. The profile P2 will remain marked as shared with user A in the event that user A eventually adds the user B.

If both users accept the invitation, either user can share any number of electronic contact files, such as through the user interface shown in FIG. 8B. For example, a user profile can be shared. Again, assume the second user B accepts the pending contact invitation from the other user. The first user A now appears in the contact list of the second user B, but the entry is empty until the first user A mutually accepts the invitation from the second user B. The profile for P2 is flagged as shared with the first user A, despite the first user A not having the user B in their contact list and the data of profile P2 will not fully be available. Now the first user A accepts their pending request to share content with the second user B. User B will now appear in the contact list of user A; the profile P1 is now marked as shared with user B. User B will now see a full data of the profile P1 in their contact list for user A; and user A will now see the full data of the profile P2 in their contact list for user B.

Figure 8E:
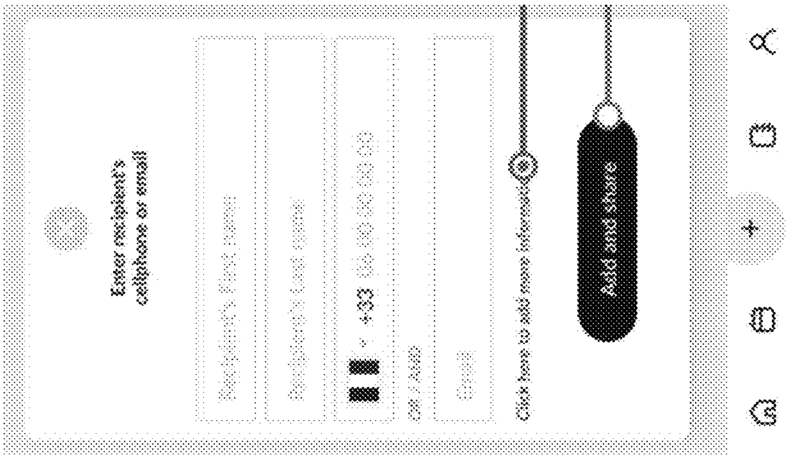
FIG. 8E is an exemplary screenshot illustrating another embodiment of the user interface of FIG. 8A.

By way of another example, contacts can also be added manually, such as shown in FIG. 8E. In a first scenario, the user A can manually add user B without sharing any profiles. In this situation, the user A adds user B in their contact list. User B does not receive any pending contact invitations and user B receives no invitation notifications (e.g., popup on the application or via email). In a second scenario, the user A can add user B and share a profile P1 with the user B. Here, user A will have user B in their contact list. Profile P1 is marked as shared with user B. User B can receive a pending contact request and a notification (e.g., via an e-mail, in-application push notification, and/or short message service) with an electronic version of the profile P1. Assuming the user B accepts their pending contact request from user A, user B will now have user A in their contact list with a full profile P1. If user B shares a profile P2 with the user A, user A will see data from profile P2 in the contact details of user B in their contact list. If user B does not share a profile with user A, then user A will not have any details for user B in their contact list. Instead, user A will only have user B in their contact list as a manually added entry without any profile information populated. Therefore, only one contact record was created here where the sender is user A, the receiver is user B, and the profile P1 is associated to this contact link between user A and B such that the user B can see the data from profile P1. In a third scenario, assume user A adds the user B and shares the profile P1. However, assume user B rejects. User A will have user B in their contact list; P1 is marked as shared with user B; user B receives a pending request including data of P1. Once user B rejects the pending request, the request is removed from the exchange device 102 of user B. User B will not have user A in their contact list and will not have an entry for profile P1. User A continues only to have user B as a manually added contact; profile P1 is unmarked as shared with the user B.

In yet another example, the user A can add a user N that has not registered with the content sharing system 100. In a first scenario, the user A can add user N manually without sharing any profile P1. User A will have user N in their contact list. In a second scenario, user A can add user N manually and share their profile P1. User A will have user N in their contact list. The profile P1 is marked as shared with the user N. If the manually added contact includes an email, an invitation is sent to the email address to register with the content sharing system 100. If the user N registers with the content sharing system 100, the same phone number or email that was saved as a manual entry in the contact list of user A is used as described above.

In another example, a meeting request can be shared. In this case, the contact sharing system 100 can also create an electronic meeting reminder in the user's electronic calendar of their device 101/102.

In a preferred embodiment, any edits made to a user profile in the content sharing system 100 is broadcasted to all other users in possession of that profile of the content sharing system 100. In other words, the edits can be dynamically pushed to all users in possession of that profile. In some embodiments, a notification can also be sent to those users that an updated profile has been pushed to their devices. Additionally and/or alternatively, each time a user in possession of that profile views that user profile, the revised profile can be downloaded and updated from the central server (or pulled/fetched from the server). For example, if a user edits their own profile on their user device 101, any exchange device 102 that has already received that profile will be updated when viewed. In some embodiments, a script file can be sent to the exchange devices 102 that are associated with the modified profile. The script can instruct the exchanged devices 102 to pull data from the central server. Additionally and/or alternatively, the script file can verify that a secured connection exists between the revised profile and the exchange devices 102 that are connected therewith. Once a secured connection is established, the exchange devices 102 can pull current data from the central server.

In some embodiments, a user can choose to stop sharing a profile with any contact. Once this happens, the logical association between the two profiles is removed. For example, when a profile of a first user is shared with a second user, the central server maintains a logical association between the two users.

Figure 9A:
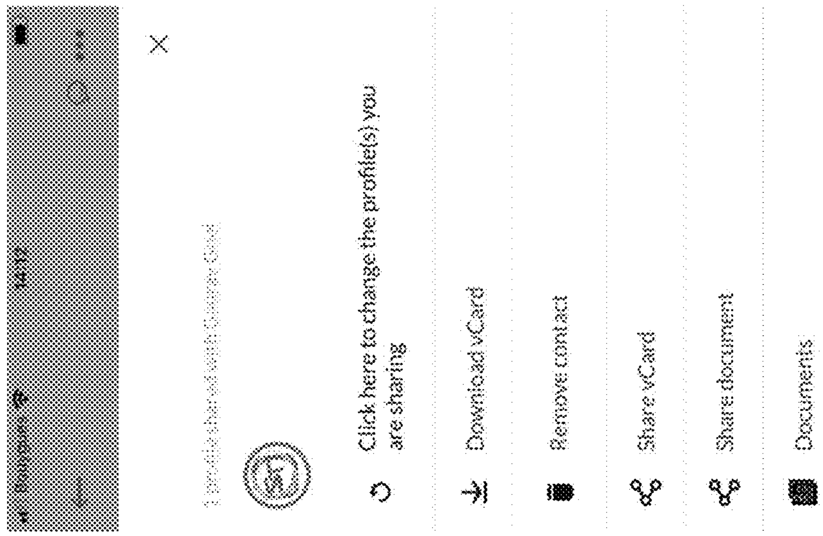
FIG. 9A is an exemplary screenshot illustrating one embodiment of a user interface for removing a contact using the content sharing system of FIG. 1.
Figure 9B:
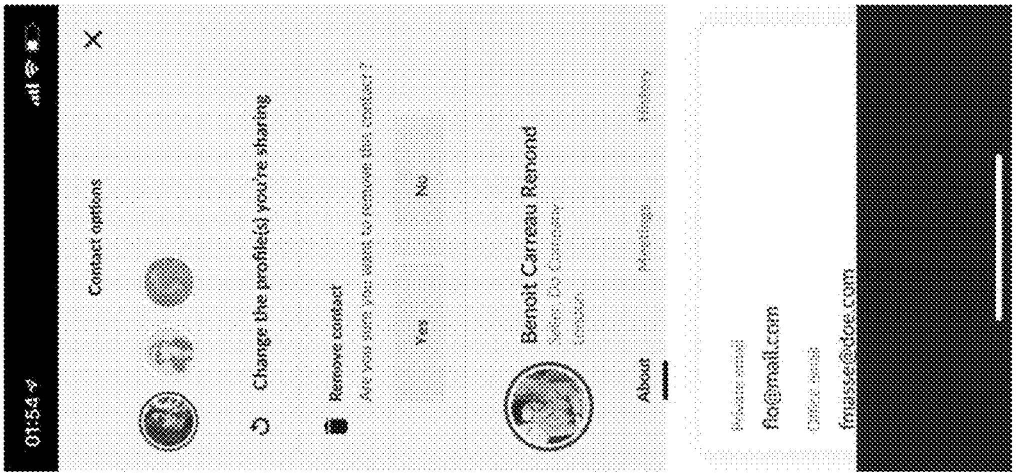
FIG. 9B is an exemplary screenshot illustrating another embodiment of the user interface for removing a contact of FIG. 6A.
Figure 9C:
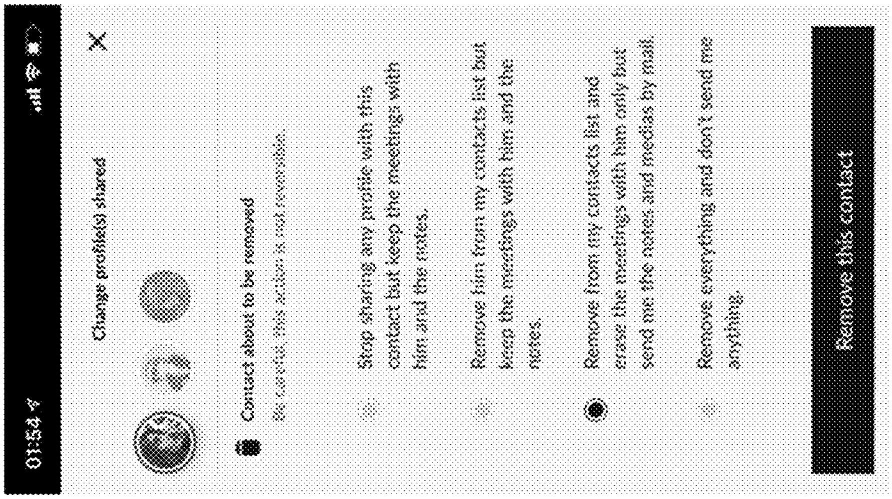
FIG. 9C is an exemplary screenshot illustrating another embodiment of the user interface for removing a contact of FIG. 6A.

Turning to FIGS. 9A-C, an exemplary series of user interfaces are shown for removing a contact from a user profile. As shown in FIG. 9A, selecting the "remove contact" option triggers a confirmation to remove the selected contact shown in FIG. 9B. Once confirmed, the contact can be removed from the contact list, such as shown in FIG. 9C. In some embodiments, the central server then removes the logical association with this contact.

Without any condition, the user can delete his profile and choose the "fate" of the contacts with whom he shared this profile: delete them, share another profile, create a new one. In other words, if a user deletes his profile, all logical associations with the contacts with whom the profile is shared with is removed.

Figure 10A:
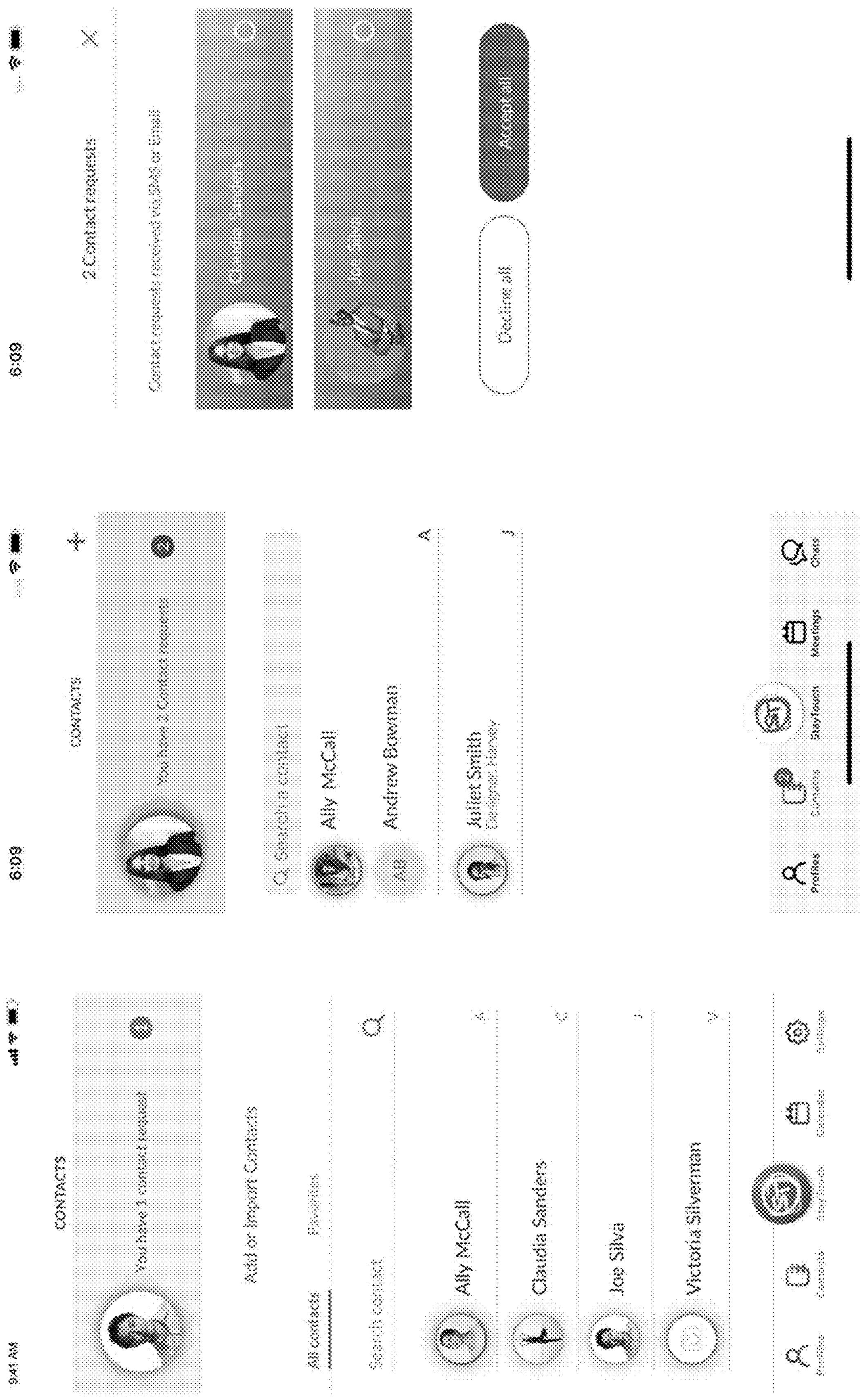
FIG. 10A is an exemplary screenshot illustrating one embodiment of a user interface for presenting a contact list using the content sharing system of FIG. 1.
Figure 10B:
FIG. 10B is an exemplary screenshot illustrating another embodiment of the user interface for presenting the contact list of FIG. 10A.
Figure 10C:
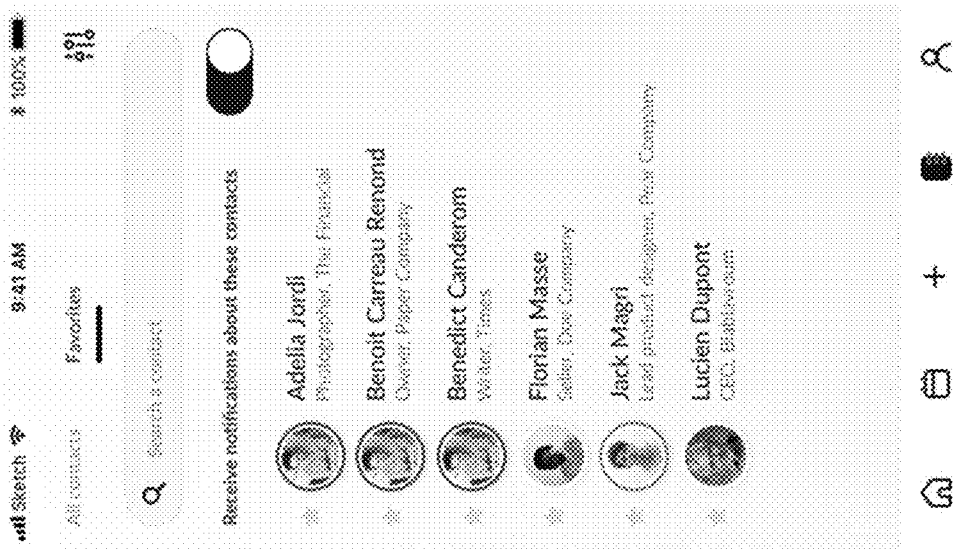
FIG. 10C is an exemplary screenshot illustrating another embodiment of the user interface for presenting the contact list of FIG. 10A.
Figure 10D:
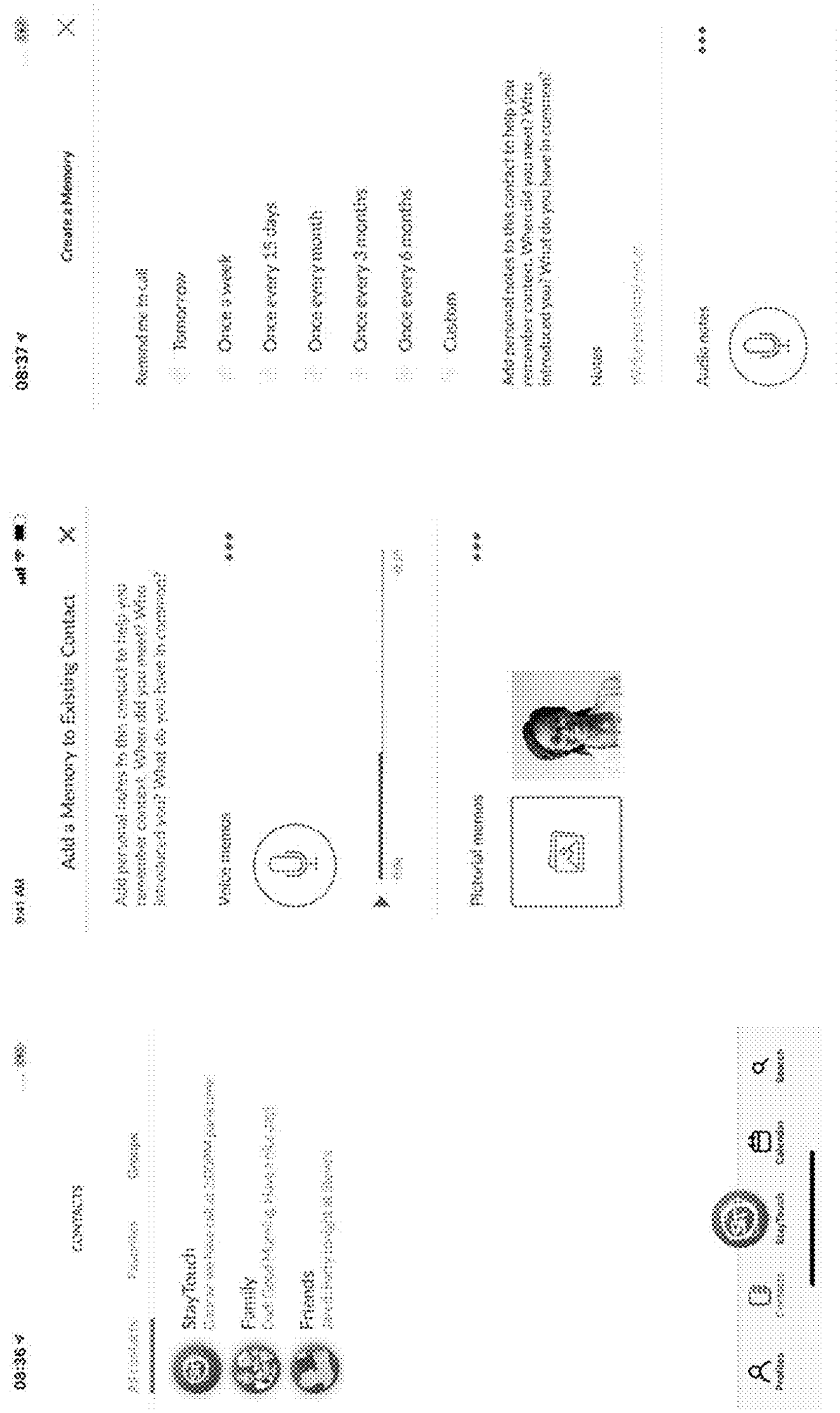
FIG. 10D is an exemplary screenshot illustrating another embodiment of the user interface for presenting the contact list of FIG. 10A.

Additionally and/or alternatively, the mobile application enables the user to create their own address book, such as shown in FIGS. 10A-C. Turning to FIGS. 10A-C, a user's contact list is shown. As shown in FIG. 10A, the contact list includes all pending contact requests from other users shown as pending notifications. The custom address book includes all personal and/or professional contact information that the user has shared and the contact information of all profiles shared with the user, such as shown in FIG. 10B. In some embodiments, contacts can be grouped, such as shown in FIGS. 10C-D. For example, in FIG. 10C, a list of favorite contacts can be selected. As shown, updates and notifications involving these contacts can be directly pushed to a user device 101. In some embodiments, directly pushing updates and notifications includes calling a share function and passing a contact ID and a profile ID as parameters to the share function. This triggers a push notification on the central server to notify the user to accept/reject the push request. An application programming interface (API) call can also be made to flag the relationship between two devices/profiles such as to avoid future verification requirements.

Figure 10E:
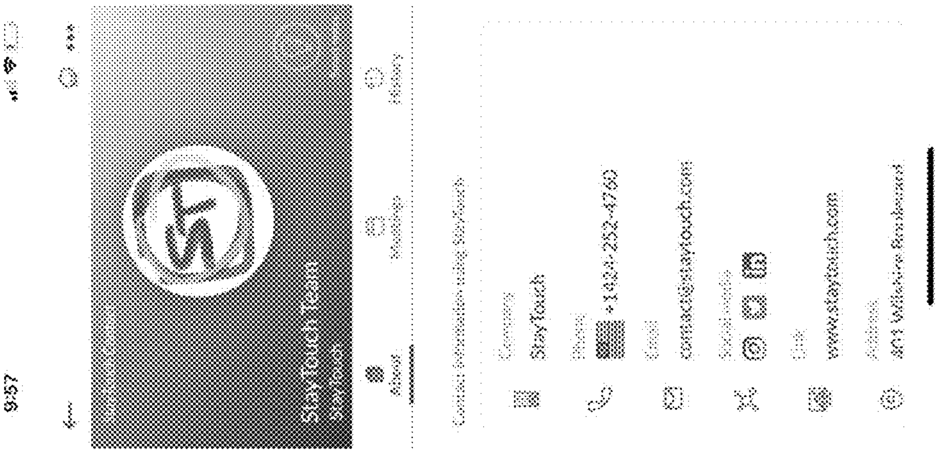
FIG. 10E is an exemplary screenshot illustrating another embodiment of the user interface for presenting the contact list of FIG. 10A.

As another example, custom groups can be defined as shown in FIG. 10D. As shown in FIG. 10D, users can be categorized into "Family," "Friends," or a company group. Selected contacts can also individually have specific preferences associated. If a profile is selected, the address book also enables the user to directly contact the user, for example, by clicking on the telephone number associated with another user to call the user or send a message, such as shown in FIG. 10E. As shown in FIG. 10E, users can also add personal notes to each contact, or a group of contacts as shown in FIG. 10E. Each entry in the address book can also include a tab for initiating an electronic meeting invitation with a selected client.

Figure 11A:
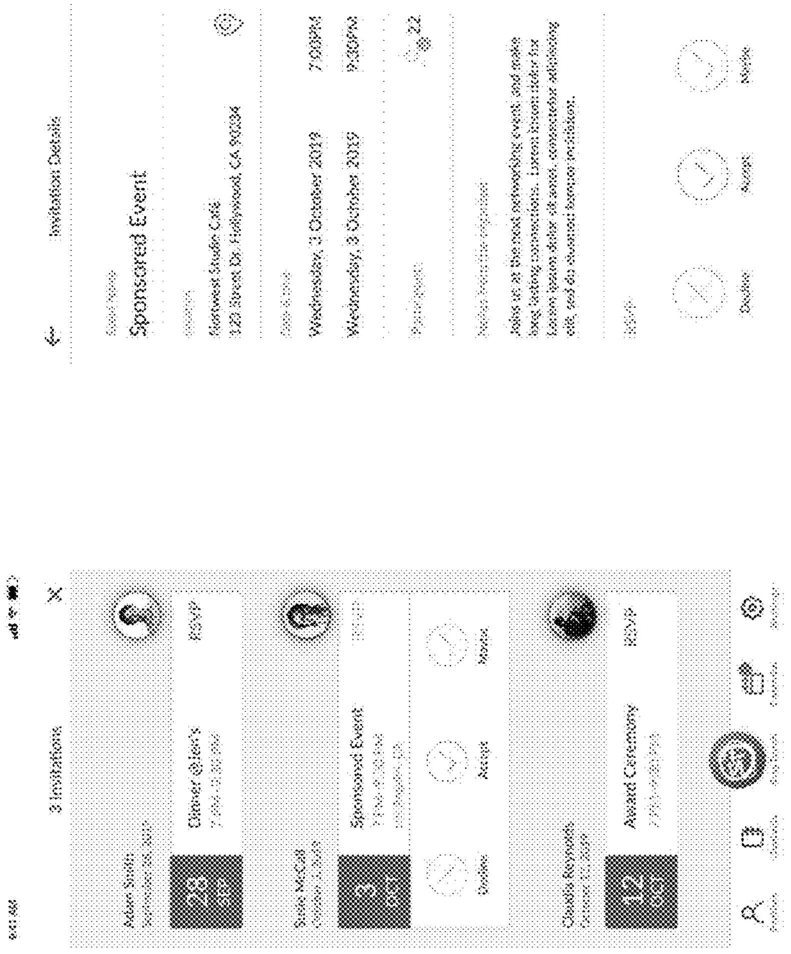
FIG. 11A is an exemplary screenshot illustrating one embodiment of a user interface for presenting a calendar using the content sharing system of FIG. 1.
Figure 11B:
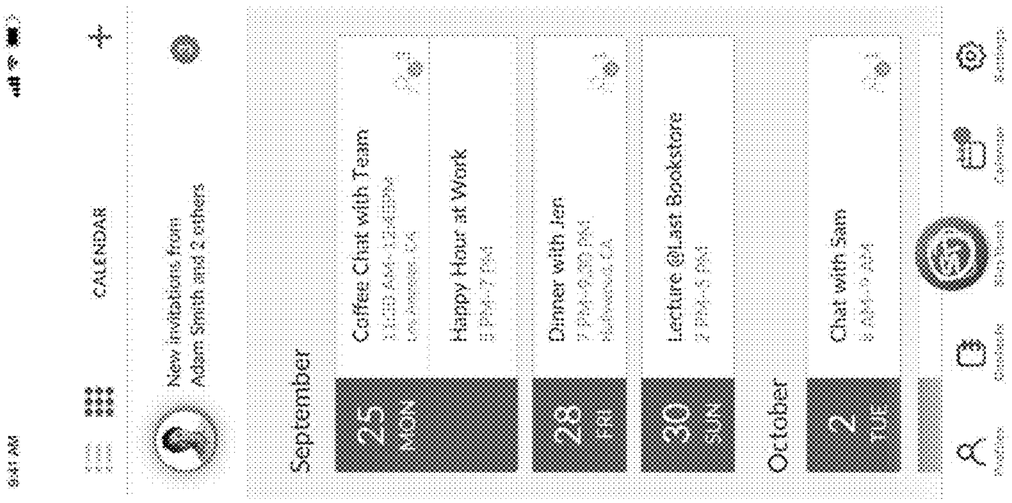
FIG. 11B is an exemplary screenshot illustrating another embodiment of the user interface for presenting the calendar of FIG. 11A.
Figure 11C:
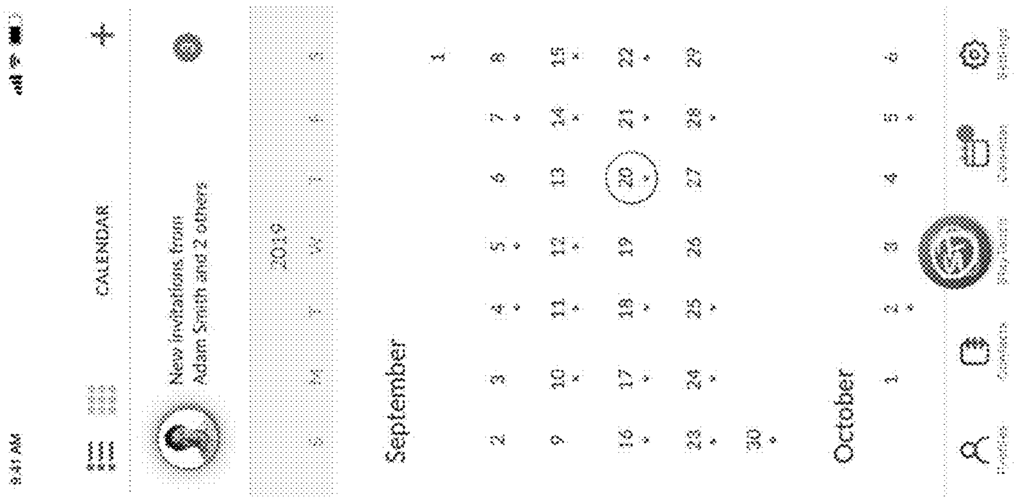
FIG. 11C is an exemplary screenshot illustrating another embodiment of the user interface for presenting the calendar of FIG. 11A.
Figure 11D:
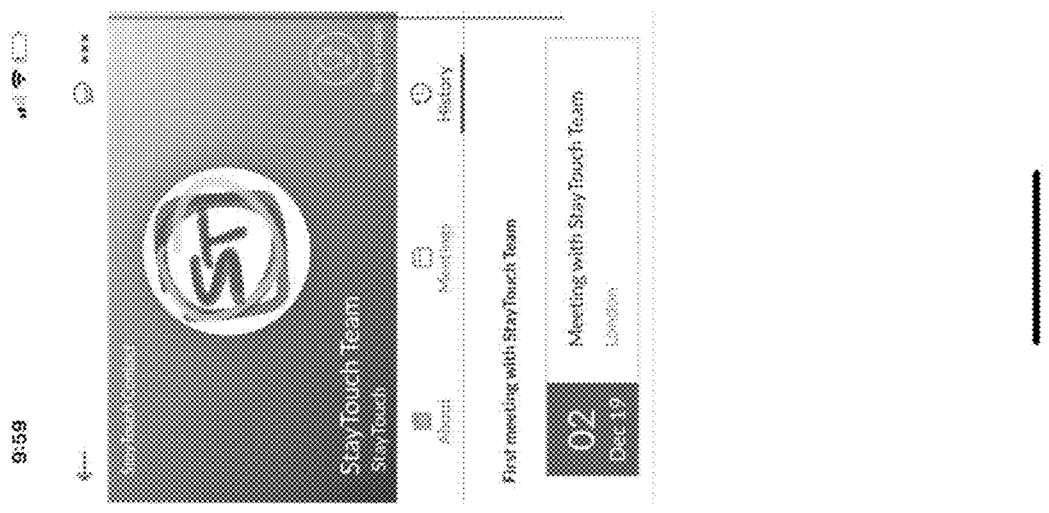
FIG. 11D is an exemplary screenshot illustrating another embodiment of the user interface for presenting the calendar of FIG. 11A.

With reference to FIGS. 11A-F, all meeting details can be seen from a user interface of the mobile application that shows the user's calendar. Events can be viewed from both a contact profile as well as a calendar view. For example, FIG. 11A illustrates upcoming events organized by related contact profiles. Specific events can be selected for additional information. FIG. 11B illustrates a user's task list for a predefined period of time. The same task list can be accessed through a calendar view shown in FIG. 11C. A history of tasks can also be presented as shown in FIG. 11D.

Figure 11E:
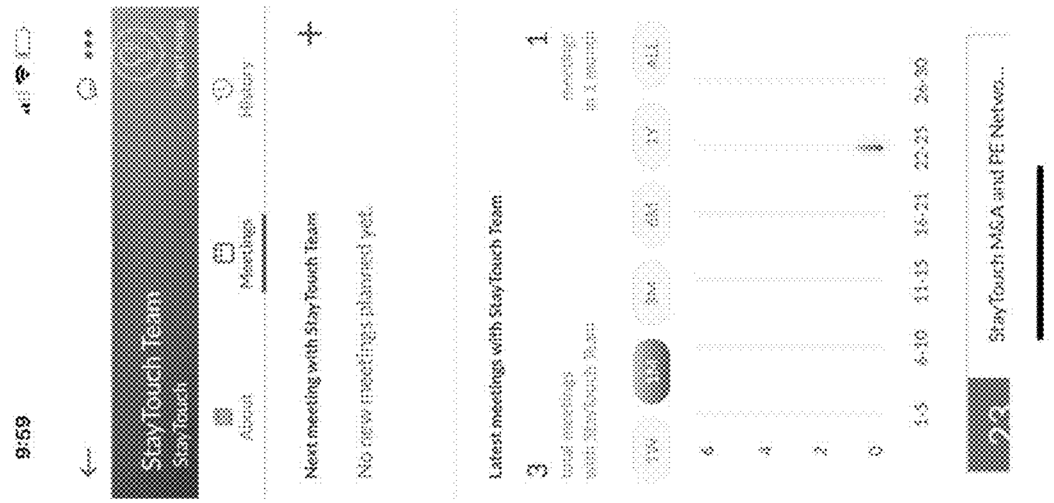
FIG. 11E is an exemplary screenshot illustrating another embodiment of the user interface for presenting the calendar of FIG. 11A.
Figure 11F:
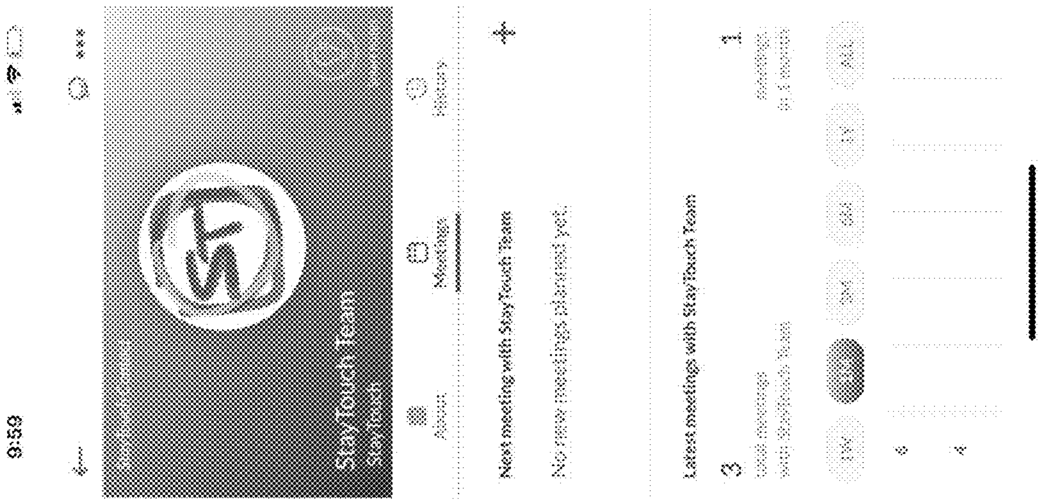
FIG. 11F is an exemplary screenshot illustrating another embodiment of the user interface for presenting the calendar of FIG. 11A.

Additionally and/or alternatively, a graph can be used to demonstrate the number of meetings and frequency of meetings with a particular user and/or group of users, such as shown in FIG. 11E. The graphs can have predetermined time periods for filters (e.g., meetings over the last week, meetings over the last month, meetings over the last three months, and so on). Below the graph, all meeting details can be displayed and include any notes that the user has recorded via text, picture, and/or audio. Additional options to follow-up can be present on the user interface, such as shown in FIG. 11F.

Figure 11G:
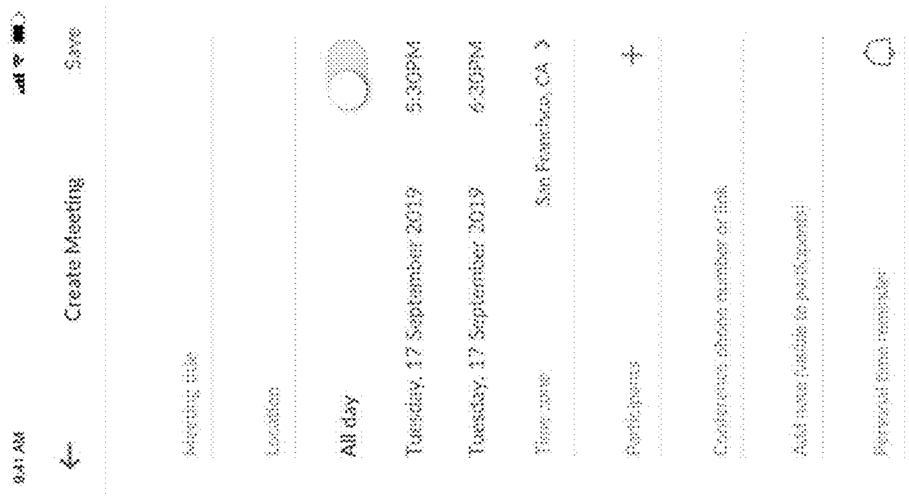
FIG. 11G is an exemplary screenshot illustrating another embodiment of the user interface for presenting the calendar of FIG. 11A.

Additionally and/or alternatively, once users accept content sharing invitations and share contact information, the content sharing system 100 can also create meetings dynamically. FIG. 11G illustrates an exemplary screenshot for manually creating a meeting. Alternatively, in some embodiments, an invitation can be sent via the application without the need for short message services, electronic mails, or other manual calendar invites. In some embodiments, the content sharing system 100 can cooperate with third-party software applications installed on the user device 101 or the exchange device 102. By way of example, any electronic mail can be synchronized with a native electronic mail app of the user device 101 or exchange device 102, such as Microsoft Outlook, Microsoft Exchange, Google Gmail, or so on. Accordingly, any mail received by the user device 101 or the exchange device 102 can be received through any communication medium on those devices. Similarly, calendar invites can also be integrated with any third-party calendar application on the devices 101/102.

Figure 12A:
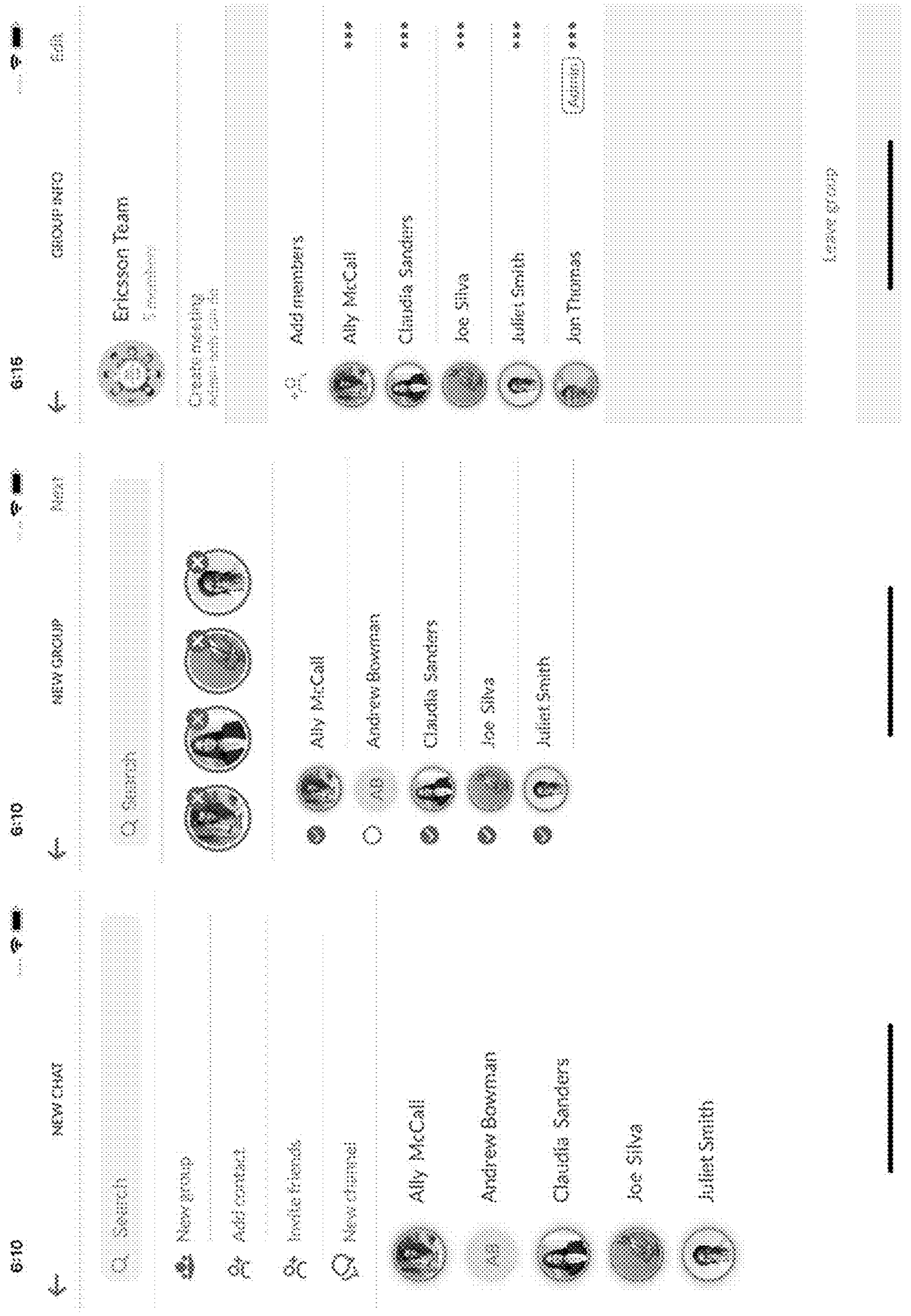
FIG. 12A is an exemplary screenshot illustrating one embodiment of a user interface for enabling a chat between one or more users using the content sharing system of FIG. 1.
Figure 12B:
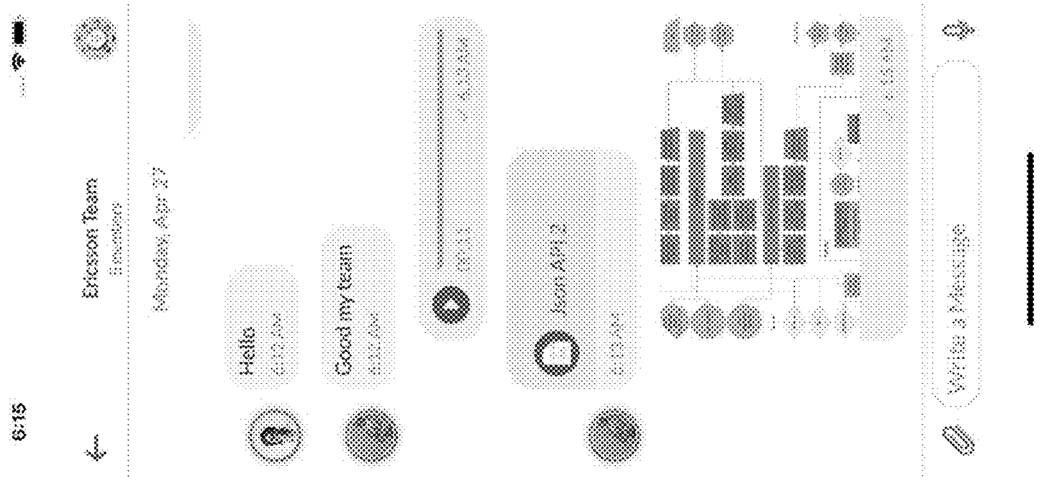
FIG. 12B is an exemplary screenshot illustrating another embodiment of the user interface for enabling the chat of FIG. 12A.

As previously described, users can interact with one another through the content sharing system 100 by using the proximity-based communication 103 described herein. Even further, once users have established a proximity-based communication 103, users can advantageously interact with each other without additional physical proximity. In other words, once contact information has been exchanged, the content sharing system 100 can provide additional communication methods for connected users. By way of example, the content sharing system 100 can provide a chat feature. With reference to FIGS. 12A-F, users can seamlessly communicate with each other through instant messaging, group messaging, channel broadcasting, and so on. In some embodiments, the chat feature is enabled using a real-time socket connection and the central server. A chat session can be initiated between two connected users (or a group of users once a group chat is created). When a user sends a message to the chat, the message is transmitted using the real-time socket protocol and received at any user account that is listening on the channel. FIG. 12A illustrates an exemplary user interface for establishing a new chat. As shown, instant messages can be directed to an individual contact and/or to a group of contacts. If a group of contacts are selected, settings of a the group can be modified as also shown. An exemplary chat interface is shown in FIG. 12B.

Figure 12C:
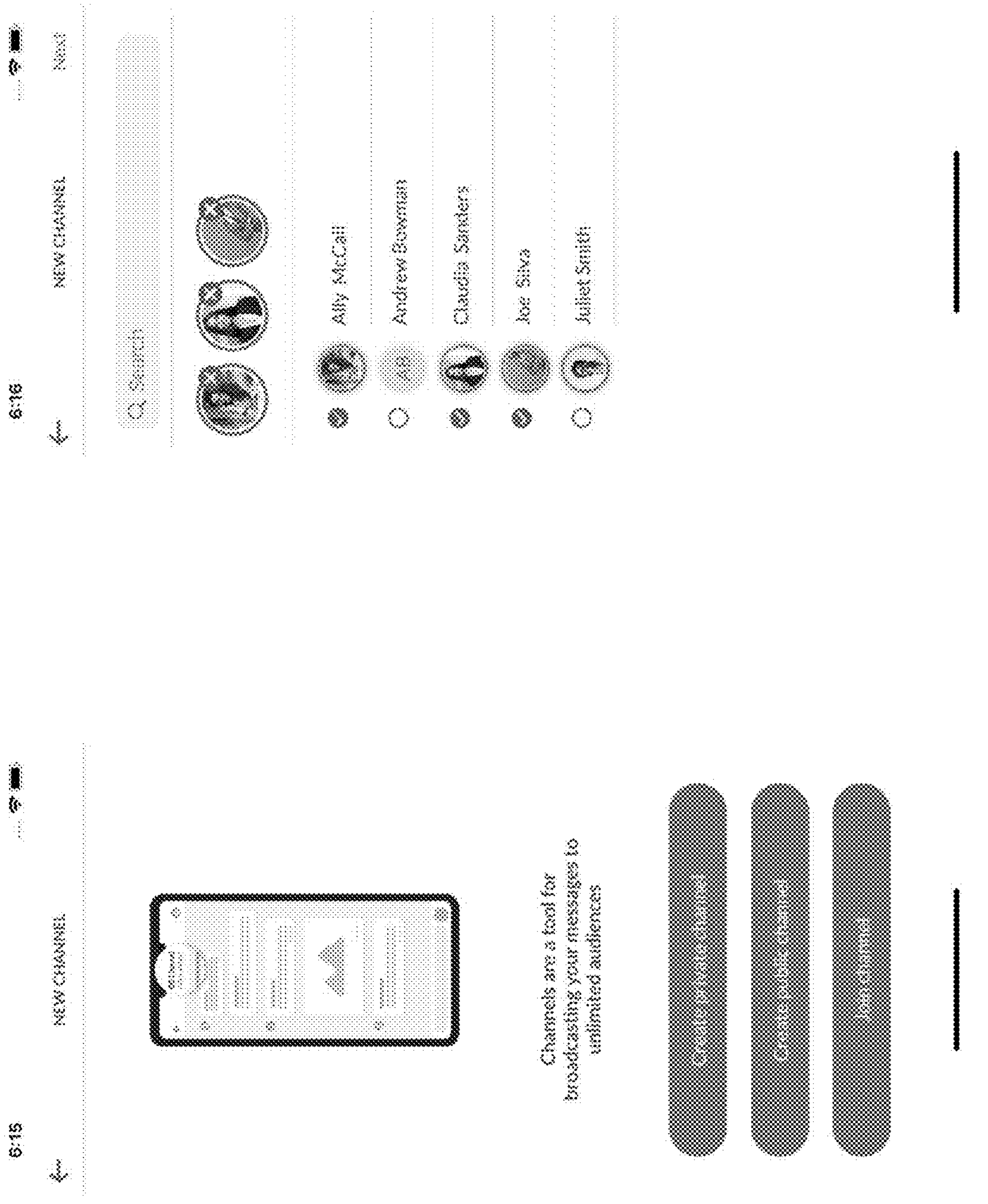
FIG. 12C is an exemplary screenshot illustrating another embodiment of the user interface for enabling the chat of FIG. 12A.
Figure 12D:
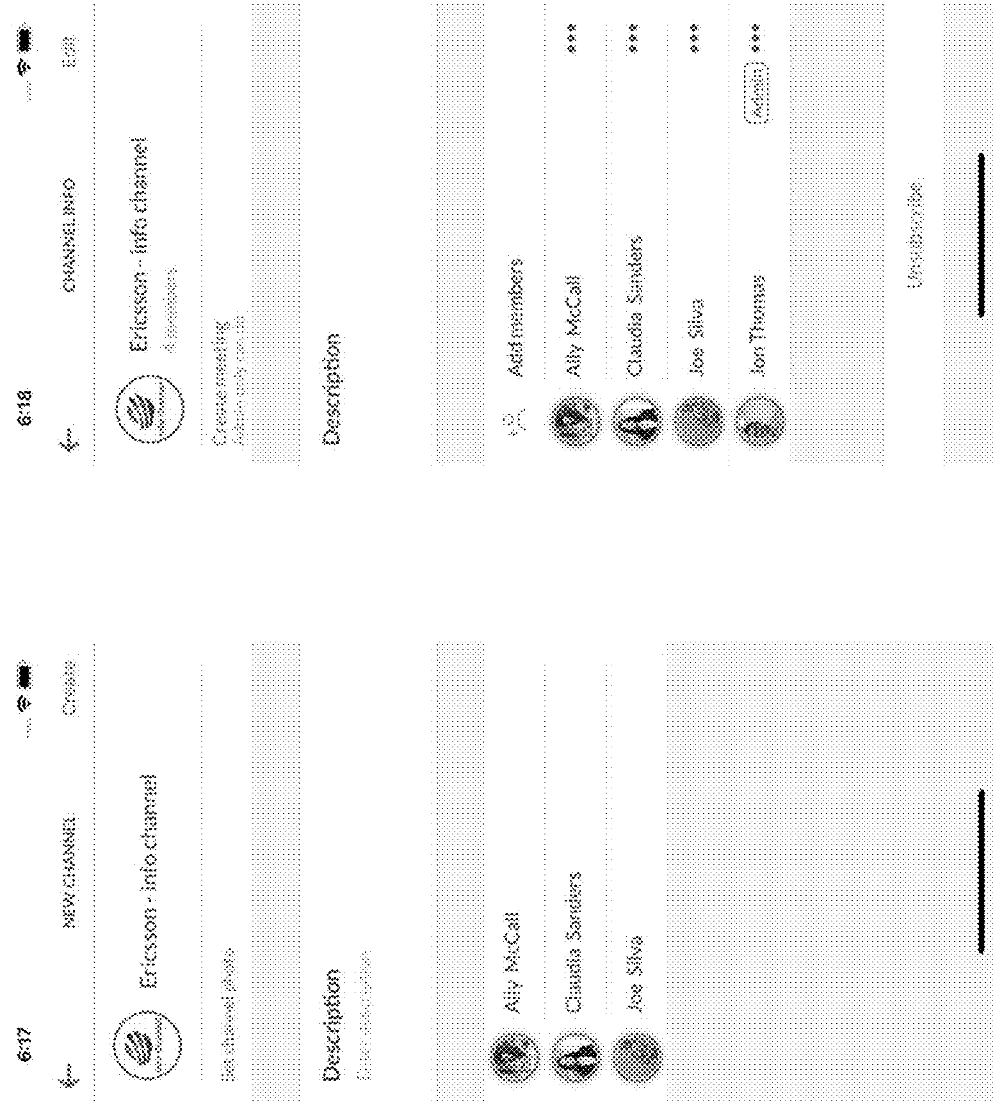
FIG. 12D is an exemplary screenshot illustrating another embodiment of the user interface for enabling the chat of FIG. 12A.

In some embodiments and with reference to FIG. 12C, users can also create broadcast channels for broadcasting messages to a wider audience. This feature can be limited to a selected group of users (e.g., administrators or selected users) to alleviate resource/bandwidth allocation. Channels can be broadcast to a selected audience as shown in FIG. 12C. Alternatively, channels can be public and made available to anyone who subscribes to a user's feed. For example, users can subscribe to a channel to listen to any broadcast. Public channels are searchable by any user while private channels are not searchable and can only be accessible with the permission of the owner/administrator of the channel. In some embodiments, a group of users can participate in a broadcast, such as shown in FIG. 12D.

Figure 12E:
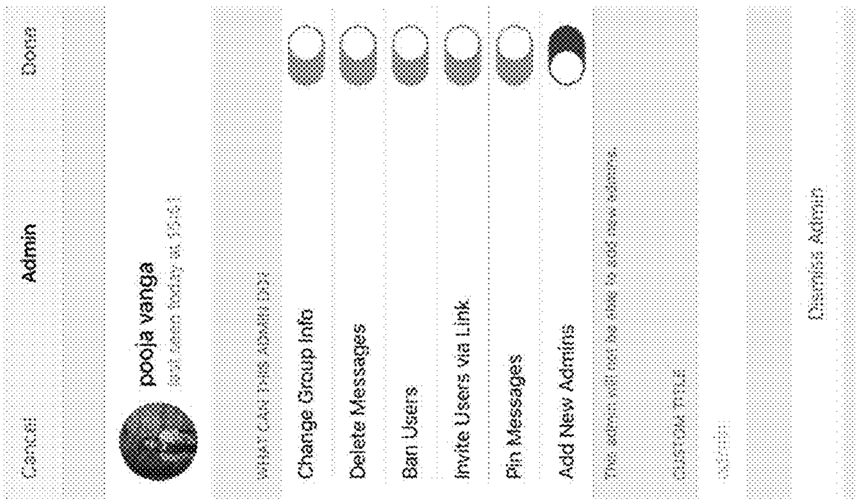
FIG. 12E is an exemplary screenshot illustrating another embodiment of the user interface for enabling the chat of FIG. 12A.
Figure 12F:
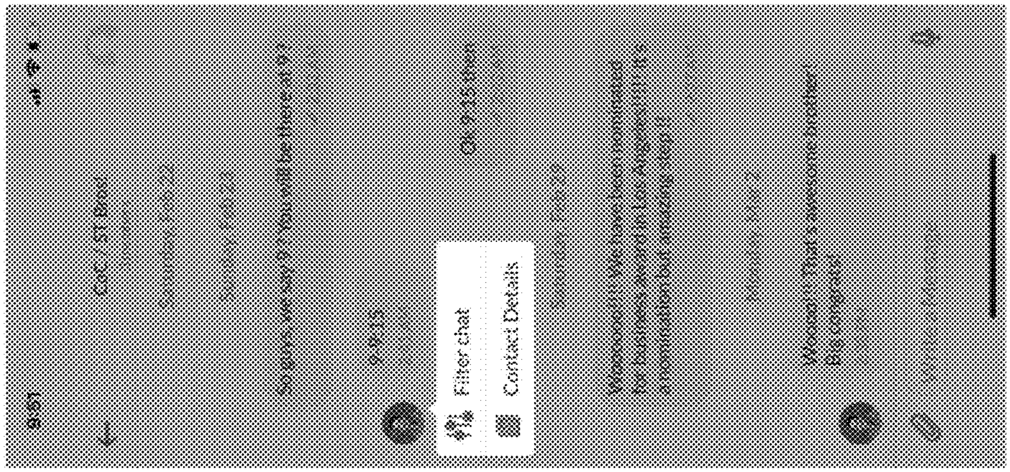
FIG. 12F is an exemplary screenshot illustrating another embodiment of the user interface for enabling the chat of FIG. 12A.

For group chats and/or broadcast channels, some users can be identified as administrators, as shown in FIG. 12E. Advantageously, the administrators have special privileges, such as editing group chat functions and settings. In some embodiments, any user can also modify their own chat view, such as by filtering messages from specific users in a group message, as shown in FIG. 12F.

Figure 13A:
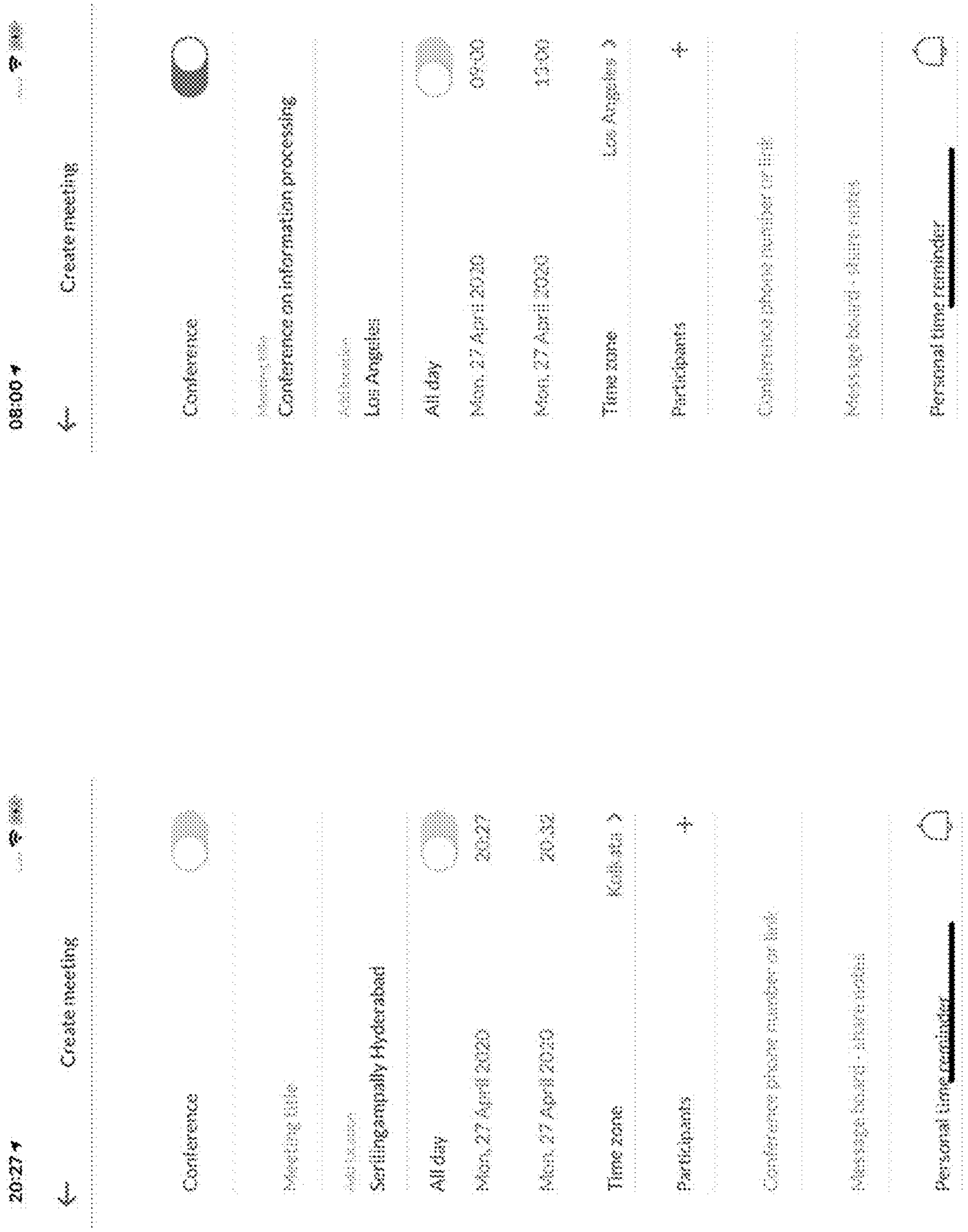
FIG. 13A is an exemplary screenshot illustrating one embodiment of a user interface for enabling a conference between one or more users using the content sharing system of FIG. 1.
Figure 13B:
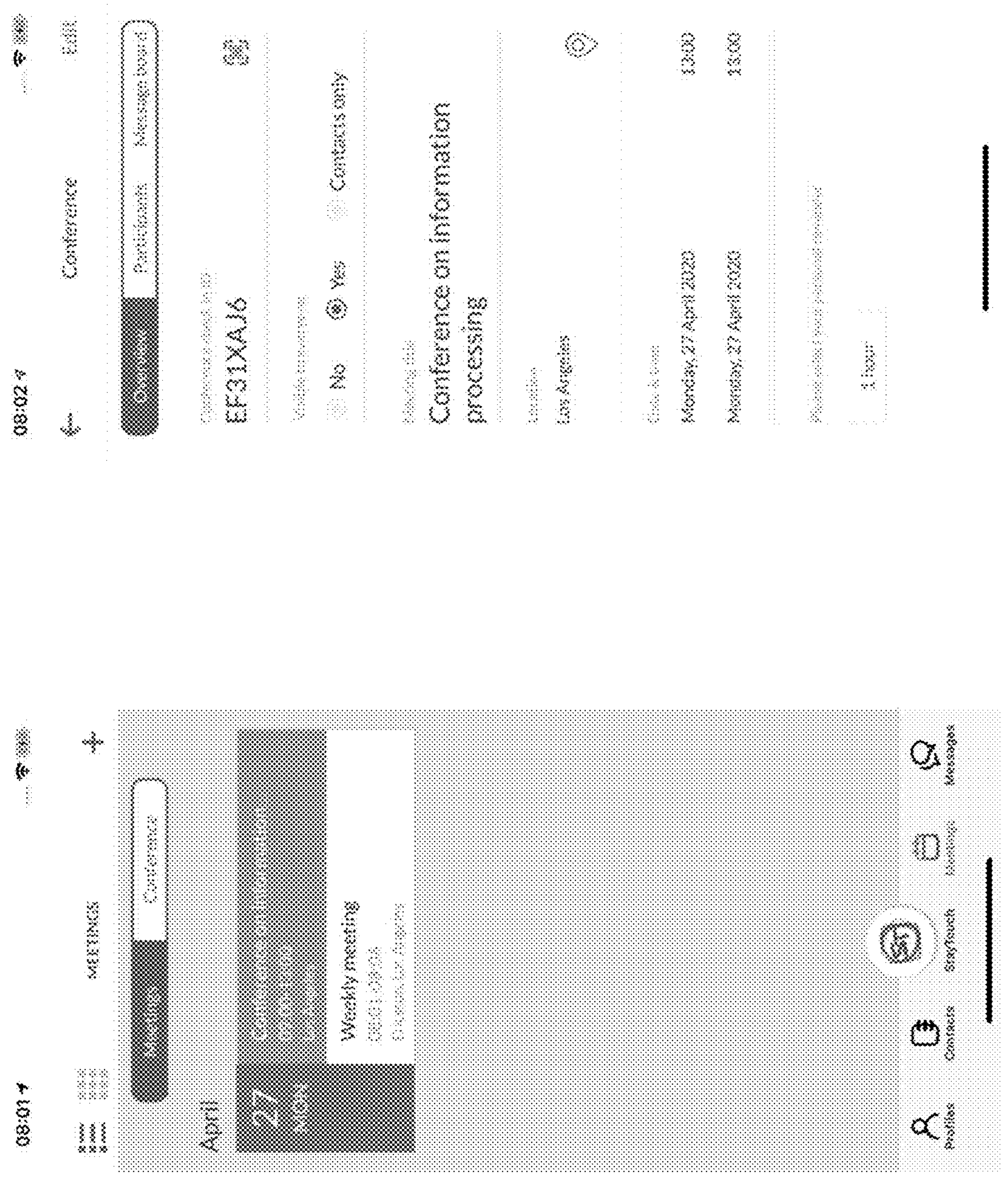
FIG. 13B is an exemplary screenshot illustrating another embodiment of the user interface for enabling the conference of FIG. 13A.

Additionally and/or alternatively, the content sharing system 100 can also provide a conference feature, such as shown in FIGS. 13A-E. Turning to FIG. 13A, a user interface is shown for creating a conference. As shown, the conference generation appears similar to the meeting creation shown in FIG. 11G. The meeting can be either public or private, wherein a private meeting generates invitations to specified recipients only. The private meeting also generates a unique meeting identifier (ID), such as a unique Quick Response (QR) code, such as shown in FIG. 13B. The conference creation can leverage the unique meeting ID and/or QR code, for example, by using the ID and/or QR code to share the conference invitation.

Figure 13C:
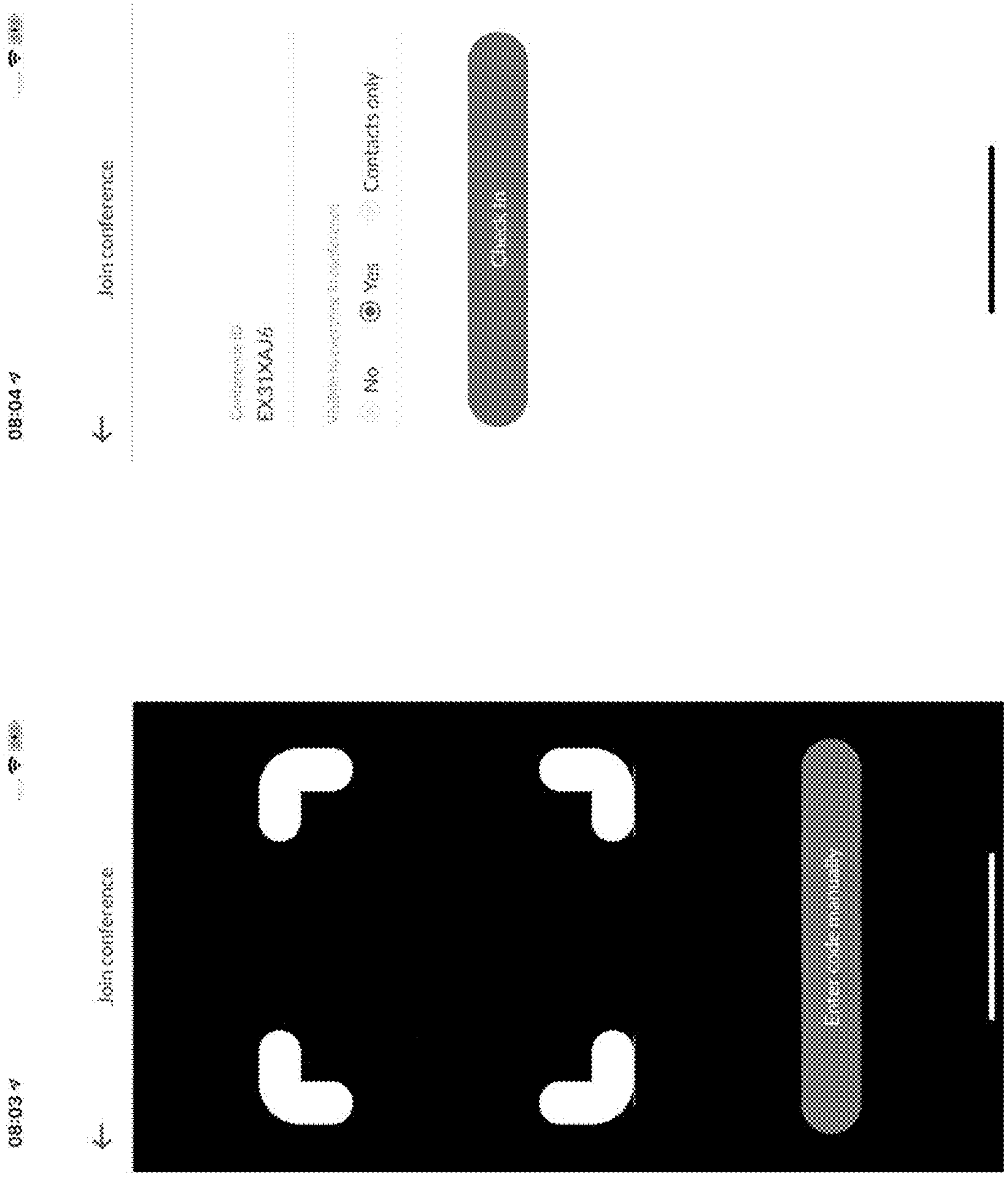
FIG. 13C is an exemplary screenshot illustrating another embodiment of the user interface for enabling the conference of FIG. 13A.
Figure 13D:
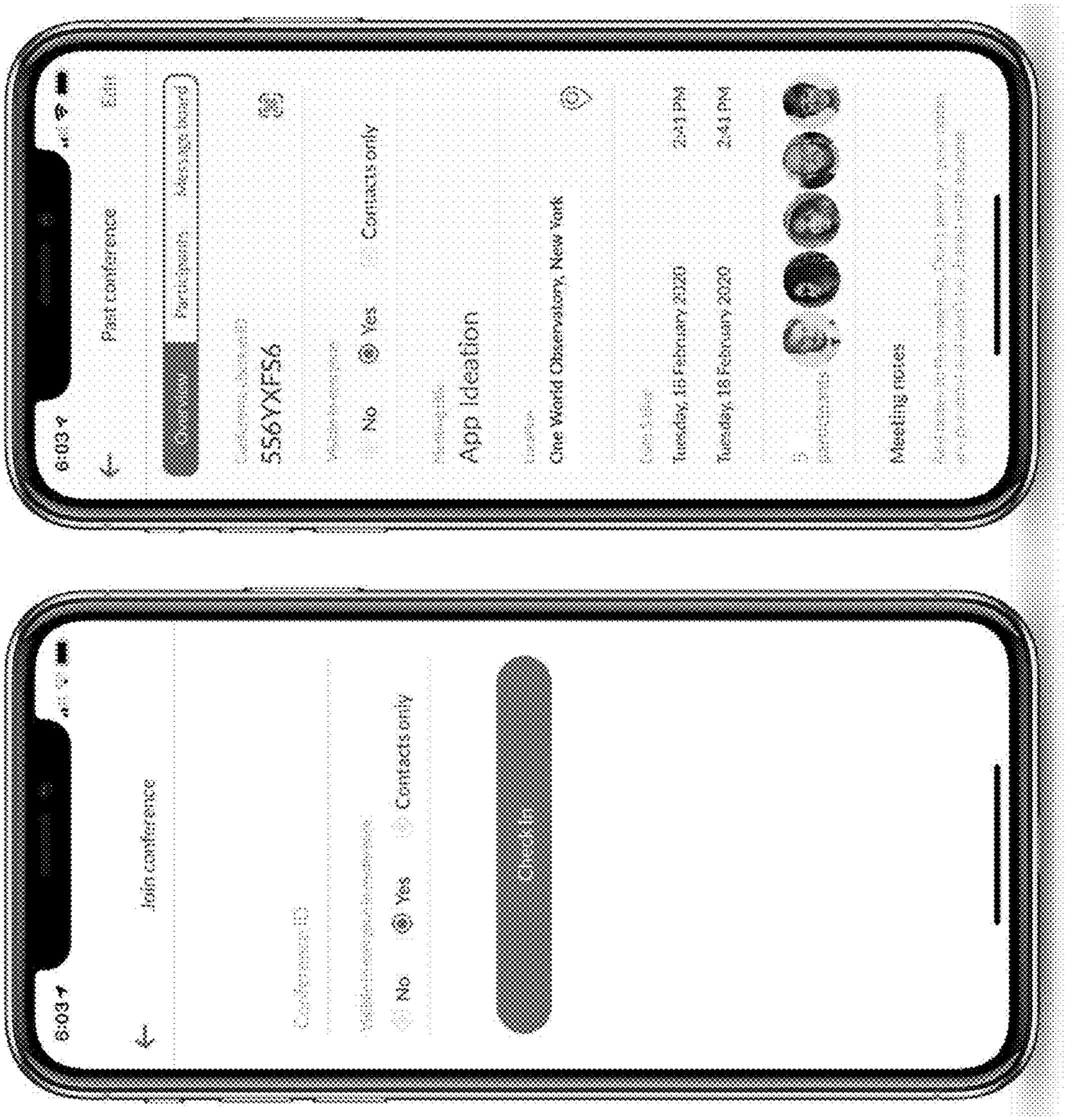
FIG. 13D is an exemplary screenshot illustrating another embodiment of the user interface for enabling the conference of FIG. 13A.
Figure 13E:
FIG. 13E is an exemplary screenshot illustrating another embodiment of the user interface for enabling the conference of FIG. 13A.

To join a conference, a link can be used. In other embodiments, either the conference ID and/or the QR code can be used to join a conference, such as shown in FIG. 13C. Participants of a conference can view the list of other participants, such as shown in FIG. 13D. From this list, any participant can connect and contact pother participants of the conference using the features described herein. Turning to FIG. 13E, the conference also supports a message board for participants to share messages, documents, pictures, audio files, and other multimedia. Similar to a meeting, a conference can be set to public or private. Public conferences are accessible by anyone while private conferences are only accessible once the administrators/creators of the conference validate a request to join (except invitees who were already sent a conference invitation at the creation of the conference).

As described above, user updates to their own profile can be dynamically broadcast to other users of the content sharing system 100. For example, users can update their profile information to select a primary number. This update can be broadcast to all users in their contact list with whom a profile has been exchanged to notify those users of the preferred number to use when reaching the user. The custom calendar can display the entire history of all updates for each user. For example, whenever a user updates their job title, name of their company, or their residence, the history tab of the mobile application can show these updates as a summarized version, thereby making it easily readable without the need for flipping through a history of documents, emails, Web pages, applications, or notes.

In an even further embodiment, the content sharing system 100 can rely on geolocation for notifying a user if one of their contacts is located in their physical proximity. For example, users can be notified if their contacts are near them at an airport lounge or during a public conference.

In another embodiment, the content sharing system 100 enables the creation of a virtual conference room on the user device 101 or the exchange device 102. This feature enables placement of a virtual card arranged according to the physical conference set-up to better identify the participants of a meeting. In some embodiments, an augmented reality system can be included in the user device 101 or the exchange device 102 for providing mixed-reality content from the content sharing system 100.

The content sharing system 100 can also cooperate with additional hardware. By way of example, smart watches can be synchronized with the content sharing application of the content sharing system 100 to access the same features described herein. Global positioning system (GPS) hardware on the user device 101 or the exchange device 102 can also provide maps and geolocation, for example, when a meeting invite includes an address.

Figure 14:
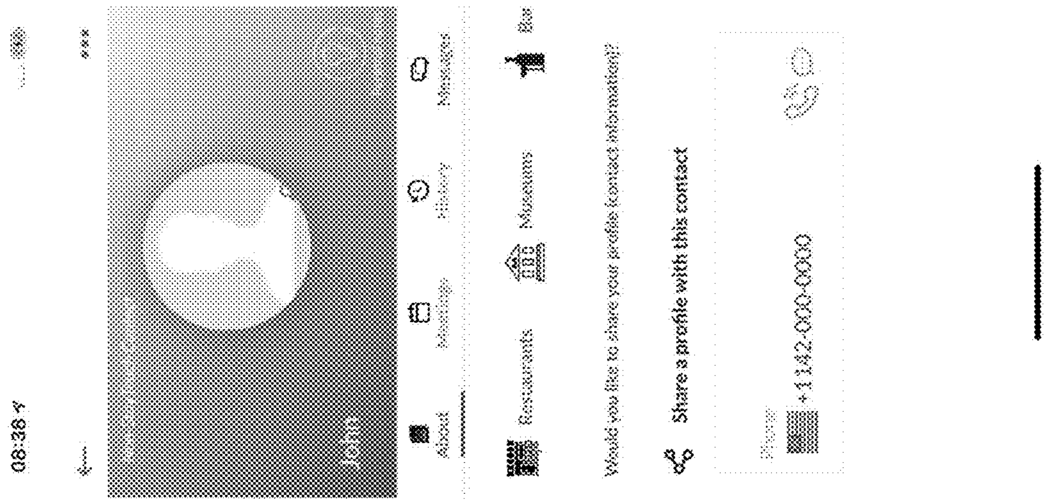
FIG. 14 is an exemplary screenshot illustrating one embodiment of a user interface for using a position detection feature using the content sharing system of FIG. 1.

In another example, the content sharing system 100 can cooperate with a wireless receiver (such as using BLE or NFC) for "checking-in" to meetings, offices, or geolocations. For example, a user interface can be provided as shown in FIG. 14 to enable a user to check-in to a location or meeting. Each time a user goes to an office for a meeting or conference, the content sharing system 100 can enable a touch feature and "check-in" to the meeting for retrieving all information related to the meeting, alleviating the need for a receptionist. Checking-in can optionally notify relevant contacts in the user's contact lost.

In yet another embodiment, the content sharing system 100 can transcribe any audio notes or files to be shared with other users.

The content sharing system 100 advantageously enables a smooth and easy exchange of contact details. The user of the content sharing system 100 shares only what they want to share. Anyone with a smartphone can participate in the content sharing system 100 to connect with potential business partners, sales targets, colleagues, and classmates. Users can add personal notes to identify and remember contacts long after a first meeting. For example, the content sharing system 100 can provide a user interface for adding notes, pictures, or voice notes to a contact to better identify and remember the contact. Once a user updates their contact information, the update can be broadcasted to all connections, reducing the need to browse social networking sites or requesting an update. The content sharing system 100 enables real-time tracking of meetings, frequencies of meetings, follow-ups, meeting minutes, and so on.

Figure 15:
FIG. 15 is an exemplary screenshot illustrating one embodiment of a user interface for modifying user settings for the content sharing system of FIG. 1.

FIG. 15 is a screenshot illustrating an exemplary user interface for managing settings, such as the settings described herein, using the content sharing system 100.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A computer-based method for facilitating the contactless exchange of digital information, the method comprising:

automatically scanning, via an antenna of a user device, for one or more exchange devices within a predetermined range of the user device;

identifying at least one of the scanned exchange devices to initiate proximity-based communication with the user device; and exchanging at least a profile identification (ID) and a user ID of a user of the user device directly with the identified exchange devices without manually pairing the user device with the identified exchange devices, thereby prompting the identified exchange devices to display a user interface for accepting two-way communication for directly exchanging digital contact information between the user device and the identified exchange devices;

receiving user input at the identified exchange device accepting the two-way communication; and maintaining, in a database of a central server in operable communication with the user device and the one or more exchange devices, logical connections between user profiles of the user device and the identified exchange device upon the received user input.

2. The computer-based method of claim 1, wherein said automatically scanning comprises automatically scanning via a Bluetooth low energy antenna of the user device.

3. The computer-based method of claim 1, wherein said identifying at least one of the scanned exchange devices to initiate proximity-based communication with the user device is based on a received signal strength indicator of each scanned exchange device.

4. The computer-based method of claim 1, further comprising automatically pushing updates from a central server to both the identified exchange device and the user device upon establishing two-way communication for exchanging digital contact information.

5. The computer-based method of claim 4, wherein said automatically pushing updates from a central server comprises transmitting a script file to both the identified exchange device and the user device.

6. The computer-based method of claim 1, further comprising defining usage description keys of the user device by maintaining an information property list file for direct two-way communication between the user device and the identified exchange devices.

7. A system for sharing electronic content, the system comprising:

a user device;

one or more exchange devices configured for proximity-based communication with the user device; and a central server in operable communication with the user device and the one or more exchange devices for maintaining in a database, logical connections between user profiles, wherein the user device automatically scans the one or more exchange devices within a predetermined range, filters the scanned devices, selects at least one of the one or more exchange devices, and directly exchanges at least a profile identification (ID) and a user ID with the selected exchange devices without manually pairing the user device with the selected exchange devices, thereby prompting the selected exchange devices to display a user interface for accepting two-way communication for directly exchanging digital contact information between the user device and the selected exchange devices.

8. The system of claim 7, wherein the one or more exchange devices communicate with the user device via Bluetooth low energy.

9. The system of claim 7, wherein the user device selects at least one of the one or more exchange devices based on a received signal strength indicator of each scanned exchange device.

10. The system of claim 7, wherein the user device and the selected exchange device automatically broadcast updates upon establishing two-way communication for exchanging digital contact information.

11. The system of claim 10, wherein the automatically broadcast updates are received from the central server and comprises transmitting a script file from the central server to both the selected exchange device and the user device.

12. The system of claim 7, wherein the user device automatically establishes a real-time socket connection with the selected exchange device upon establishing two-way communication for generating a chat session.

13. A computing device for facilitating the contactless exchange of digital information with one or more exchange devices, the computing device comprising:

a display screen;

a central processing unit for executing a mobile application, the mobile application providing a graphical user interface on the display screen; and an antenna configured for proximity-based communication with the one or more exchange devices, wherein the central processing unit automatically scans to identify the one or more exchange devices within a predetermined range via the antenna, filters the scanned devices, selects at least one of the one or more exchange devices for presentation on the graphical user interface, and directly exchanges at least a profile identification (ID) and a user ID with the selected exchange devices without manually pairing the user device with the selected exchange devices, thereby prompting the selected exchange device to display a second user interface for accepting two-way communication for directly exchanging digital contact information with the user device.

14. The computing device of claim 13, wherein the antenna comprises a Bluetooth low energy antenna.

15. The computing device of claim 14, wherein the predetermined range comprises three hundred feet.

16. The computing device of claim 13, wherein the central processing unit selects the at least one of the one or more exchange devices based on a received signal strength indicator of each scanned exchange device.

17. The computing device of claim 13, wherein the central processing unit receives a script file from a central server to automatically pull updates from the central server regarding profile changes of the selected exchange device.

18. The computing device of claim 13, wherein the central processing unit automatically establishes a real-time socket connection with the selected exchange device upon establishing two-way communication for generating a chat session.

19. The computing device of claim 13, wherein the central processing unit can further generate a global positioning system location for proximity-based notifications to the selected exchange device.

* * * * *